United States Patent [19]
Trompower et al.

[11] Patent Number: 5,950,124
[45] Date of Patent: Sep. 7, 1999

[54] CELLULAR COMMUNICATION SYSTEM WITH DYNAMICALLY MODIFIED DATA TRANSMISSION PARAMETERS

[75] Inventors: Michael L. Trompower, Navarre, Ohio; Paul F. Struhsaker, Plano, Tex.; George L. Grim, III, Youngstown; James K. Holt, Hudson, both of Ohio; Victor K. Paulsen, Mineral Well, Tex.

[73] Assignee: Telxon Corporation, Akron, Ohio

[21] Appl. No.: 08/566,502

[22] Filed: Dec. 4, 1995

Related U.S. Application Data

[63] Continuation-in-part of application No. 08/523,942, Sep. 6, 1995.

[51] Int. Cl.$^6$ .................................................... H04B 7/00
[52] U.S. Cl. ..................... 455/422; 455/466; 455/557; 455/561; 455/562; 455/550; 455/551; 455/571; 455/572; 455/403; 455/23; 455/517; 455/65; 455/126; 375/281; 342/463; 342/364; 342/362
[58] Field of Search ..................... 455/422, 466, 455/557, 561, 562, 550, 551, 571, 572, 403, 23, 517, 65, 126, 522; 375/281; 342/463, 364, 362

[56] References Cited

U.S. PATENT DOCUMENTS

| | | | |
|---|---|---|---|
| 4,041,391 | 8/1977 | Deerkoski | 375/281 |
| 4,665,404 | 5/1987 | Christy et al. | 342/463 |
| 4,672,658 | 6/1987 | Kavehrad et al. | 379/63 |
| 4,907,224 | 3/1990 | Scoles et al. . | |
| 4,930,140 | 5/1990 | Cripps et al. . | |
| 5,025,486 | 6/1991 | Klughart . | |
| 5,042,050 | 8/1991 | Owen | 375/1 |
| 5,164,958 | 11/1992 | Omura . | |
| 5,177,766 | 1/1993 | Holland et al. . | |
| 5,204,876 | 4/1993 | Bruckert et al. | 375/1 |
| 5,291,516 | 3/1994 | Dixon et al. . | |
| 5,321,721 | 6/1994 | Yamaura et al. | 375/1 |
| 5,335,249 | 8/1994 | Krueger et al. | 375/1 |
| 5,341,396 | 8/1994 | Higgins et al. . | |
| 5,353,300 | 10/1994 | Lee et al. | 375/1 |
| 5,363,404 | 11/1994 | Kotzin et al. | 375/1 |
| 5,377,256 | 12/1994 | Franklin et al. . | |
| 5,425,051 | 6/1995 | Mahany . | |
| 5,450,616 | 9/1995 | Rom . | |
| 5,497,505 | 3/1996 | Koohgoli et al. | 455/452 |
| 5,509,050 | 4/1996 | Berland | 455/557 |
| 5,511,073 | 4/1996 | Padovani et al. . | |
| 5,565,982 | 10/1996 | Lee et al. . | |
| 5,574,771 | 11/1996 | Driessen et al. | 379/57 |
| 5,614,914 | 3/1997 | Bolgiano et al. | 342/364 |
| 5,673,260 | 9/1997 | Umeda et al. . | |
| 5,687,166 | 11/1997 | Natali et al. | 455/403 |
| 5,689,524 | 11/1997 | Takaki et al. . | |
| 5,694,417 | 12/1997 | Andren et al. . | |

FOREIGN PATENT DOCUMENTS

| | | |
|---|---|---|
| 579372 | 1/1994 | European Pat. Off. . |
| 622911 | 11/1994 | European Pat. Off. . |

*Primary Examiner*—Wellington Chin
*Assistant Examiner*—Keith Ferguson
*Attorney, Agent, or Firm*—Renner, Otto, Boisselle & Skylar, P.L.L.

[57] ABSTRACT

An apparatus and process for improving the performance of a cellular communication system using direct sequence spread spectrum techniques. The apparatus and process enable dynamic modification of communication system parameters including PN code length, chipping rate and modulation technique for transmission of a data packet. Modification is based on proximity of the transmitter and receiver, transmitter and receiver capabilities and other factors. The system evaluates tradeoffs between data transmission speed and communication range to improve system performance.

46 Claims, 12 Drawing Sheets

CELLULAR COMMUNICATION SYSTEM WITH DYNAMICALLY MODIFIED DATA TRANSMISSION PARAMETERS

CROSS-REFERENCE TO RELATED APPLICATION

This application is a Continuation-In-Part of Ser. No. 08/523,942, filed Sep. 6, 1995, entitled CELLULAR COMMUNICATION SYSTEM WITH DYNAMICALLY MODIFIED DATA TRANSMISSION PARAMETERS, the entirety of which is incorporated herein by reference.

TECHNICAL FIELD

This invention relates generally to the field of wireless data communication systems and, in particular, to a direct sequence spread spectrum cellular communication system which dynamically modifies data transmission parameters to enhance system performance.

BACKGROUND

In recent years, the use of cellular communication systems having mobile terminals which communicate with a hardwired network, such as a local area network (LAN) and a wide area network (WAN), has become widespread. Retail stores and warehouses, for example, may use cellular communications systems to track inventory and replenish stock. The transportation industry may use such systems at large outdoor storage facilities to keep an accurate account of incoming and outgoing shipments. In manufacturing facilities, such systems are useful for tracking parts, completed products and defects.

A typical cellular communication system includes a number of fixed base stations interconnected by a cable medium to form a hardwired network. The hardwired network is often referred to as a system backbone. Also included in many cellular communication systems are intermediate base stations which are not directly connected to the hardwired network.

Intermediate base stations, often referred to as wireless base stations, increase the area within which base stations connected to the hardwired network can communicate with mobile terminals. Unless otherwise indicated, the term "base station" will hereinafter refer to both base stations hardwired to the network and wireless base stations.

Associated with each base station is a geographic cell. A cell is a geographic area in which a base station has sufficient signal strength to transmit data to and receive data from a mobile terminal with an acceptable error rate. The error rate for transmitted data is defined as the ratio of the number of transmitted data bits received in error to the total number of bits transmitted. It is economically inefficient to design a communications system with a "zero" error rate. Rather, depending on the requirements of users of the system, an acceptable error rate is determined. For example, an acceptable error rate may be set at a maximum error correcting rate capability of an error correcting code utilized by the system.

The shape of each cell is primarily determined by the type of antenna associated with a given base station. For instance, base stations which communicate with mobile terminals often have omnidirectional type antennas which provide for generally circular shaped cells and allow for a wide area of coverage. In many instances, however, the cell of a base station is not completely symmetrical because physical structures within the cell may partially block data signals emanating from the base station or create "dead spots" where no signals can pass. Further, the cell size may be decreased by machinery located in the vicinity of the base station which generates excessive noise levels that degrade a signal transmitted by the base station. Undesirable signals that interfere with the transmission and reception of a transmitted signal are collectively referred to as noise signals. A useful quantitative measure of relative noise in a communication system is the signal-to-noise ratio (SNR). The SNR is the ratio of the amplitude of a desired signal at any given time to the amplitude of noise signals at that same time.

Generally, when a mobile terminal is powered up, it "registers" with a base station through which the mobile terminal can maintain wireless communication with the network. In order to register, the mobile terminal must be within the cell range of the base station and the base station must likewise be situated within the effective cell range of the mobile terminal. It is generally not possible to have one base station service a large area by itself. This is due to transmission power restrictions governed by the FCC and the fact that the extra hardware needed to provide a mobile terminal with such a large cell range would add significantly to the size and weight of the mobile terminal thereby making it less desirable to use. Thus, cellular communication systems generally have several base stations spaced apart such that the collective cell area coverage of the base stations is sufficient to cover the entire area in which a mobile terminal may roam. As the location of the mobile terminal changes, the base station with which the mobile terminal was originally registered may fall outside of the geographic cell range of the mobile terminal. Therefore, the mobile terminal may "deregister" with the base station it was originally registered to and register with another base station which is within its communication range.

When designing a cellular communication system for a region, an appropriate number of base stations must be selected and their locations determined to assure cell coverage for the region. Each additional base station increases the cost of the communication system by the incremental cost of the base station itself and installation fees. Both the cost of the base station and the installation costs are often great. When hardwiring a new base station to the network, both a data line and a power line must be provided. The data line allows the base station to transmit and receive information from the system backbone while the power line provides continual power to support the operations of the base station. Although wireless base stations do not require data lines since all data is communicated wirelessly, they do require power. However, providing power lines to wireless base stations can often be difficult. This is especially true in the common situation where a wireless base station is situated in a large outdoor storage facility having a concrete foundation, such as areas near a shipyard or loading dock. Typically, electrical outlets are not readily accessible in such areas and therefore power lines must be supplied to the wireless base station from the network or elsewhere. Power lines could be located on the surface of the concrete foundation, however, this provides an undesirable obstacle that must be avoided by heavy loading vehicles typically found operating at such facilities. Consequently, a trench is often created through the concrete in order to house the power lines. Unfortunately, providing such a trench adds a significant amount of extra time and cost to the installation process. Another method of supplying power to wireless base stations could involve suspending power lines from power poles. However, this method has been found implausible given the difficulty involved with erecting such power poles in the concrete foundation. As a result, there is a strong need in the art for a manner of supplying power to a wireless base station that is not unduly burdensome or costly.

Wireless communication systems such as those described above often involve spread spectrum (SS) technology. A SS communication system is one in which the transmitted frequency spectrum or bandwidth is much wider than absolutely necessary. Wideband frequency modulation (FM) is an example of an analog SS communication system. With regard to a digital SS communication system, the transmission bandwidth required by the baseband modulation of a digital signal is expanded to a wider bandwidth by using a much faster switching rate than used to represent the original bit period. Operationally, prior to transmission, each original data bit to be transmitted is converted or coded to a sequence of "sub bits" often referred to as "chips" (having logic values of zero or one) in accordance with a conversion algorithm. The coding algorithm is usually termed a spreading function. Depending on the spreading function, the original data bit may be converted to a sequence of five, ten, or more chips. The rate of transmission of chips by a transmitter is defined as the "chipping rate".

A SS communication system transmits chips at a wider signal bandwidth (broadband signal) and a lower signal amplitude than the corresponding original data would have been transmitted at baseband. At the receiver, a despreading function and a demodulator are employed to convert or decode the transmitted chip code sequence back to the original data on baseband. The receiver, of course, must receive the broadband signal at the transmitter chipping rate.

An advantage of a SS communication system is that the representation and communication of an original data bit as a sequence of chips over a wide bandwidth in lieu of transmitting the original data bit over a narrow bandwidth generally results in a lower error rate at the receiver. This is especially true in transmission environments characterized by noise having high amplitude and short duration, i.e., "spike" noise. The probability of a receiver extracting and correctly interpreting a data bit represented by a transmitted sequence of chips interspersed with random, uncorrelated noise spikes is greater than the probability of the receiver extracting and correctly interpreting a transmission of single bits interspersed with such random noise spikes.

In essence, a SS communication system utilizes increased bandwidth and a coding scheme to reduce error rate vis-a-vis a conventional baseband system. The reduction in error rate results in an improved output SNR at the receiver. For any communication system, the difference between output SNR and input SNR is defined as the processing gain of the system. In a SS communication system, the processing gain of the system is the ratio of the transmission code rate to the original information bit rate. For example, assume that the SS coding scheme utilizes a sequence of ten chips to represent one original data bit. If the ten chips are transmitted at a chipping rate such that their collective duration is equal to a single bit period at baseband, then the processing gain of the SS system is approximately equal to ten. Communication range is determined by a fully processed SNR at a receiver. The fully processed SNR is the processing gain associated with SS communication techniques combined with the received signal strength.

The coding scheme of a SS digital communication system utilizes a pseudo-random binary sequence (PRSB). One type of a digital SS communication system is known as a direct sequence spread spectrum (DSSS) system. In a DSSS system, coding is achieved by converting each original data bit (zero or one) to a predetermined repetitive pseudo noise (PN) code. A type of PN code is illustrated in FIG. 1. For this example, the digital data signal 110 is made up of a binary "1" bit and a "0" bit. A PN code 120 representing the digital data signal 110 is comprised of a sequence of ten sub bits or chips, namely, "1", "0", "1", "1", "0", "1", "1", "1", "0", "1".

The digital data signal 110 is coded or spread by modulo 2 multiplying (e.g., via an "EXCLUSIVE NOR" (XNOR) function) of the digital data signal 110 with the PN code 120. If the data bit is a "1", then the resulting spread data signal (PN coded signal) in digital form corresponds to the PN code 120. However, if the data bit to be coded is a "0", then the spread data signal in digital form will correspond to a code 130. As can be seen, the code 130 is the inverse of PN code 120. That is, the PN code and its inverse are used to represent data bits "1" and "0" respectively.

A PN code length refers to a length of the coded sequence (the number of chips) for each original data bit. As noted above, the PN code length effects the processing gain. A longer PN code yields a higher processing gain which results in an increased communication range. The PN code chipping rate refers to the rate at which the chips are transmitted by a transmitter system. A receiver system must receive, demodulate and despread the PN coded chip sequence at the chipping rate utilized by the transmitter system. At a higher chipping rate, the receiver system is allotted a smaller amount of time to receive, demodulate and despread the chip sequence. As the chipping rate increases so to will the error rate. Thus, a higher chipping rate effectively reduces communication range. Conversely, decreasing the chipping rate increases communication range.

The spreading of a digital data signal by the PN code does not effect overall signal strength (or power) the data being transmitted or received. However, by spreading a signal, the amplitude at any one point typically will be less then the original (non-spread) signal.

It will be appreciated that increasing the PN code length or decreasing the chipping rate to achieve a longer communication range will result in a slower data transmission rate. Correspondingly, decreasing the PN code length or increasing the chipping rate will increase data transmission rate at a price of reducing communication range.

FIG. 1A schematically illustrates a transmitter system or assembly 100 of a DSSS system. Original data bits 101 are input to the transmitter system 100. The transmitter system includes a modulator 102, a spreading function 104 and a transmit filter 106. The modulator 102 modulates the data onto a carrier using, for example, a binary phase shift keying (BPSK) modulation technique. The BPSK modulation technique involves transmitting the carrier in-phase with the oscillations of an oscillator or 180 degrees out-of-phase with the oscillator depending on whether the transmitted bit is a "0" or a "1". The spreading function 104 converts the modulated original data bits 101 into a PN coded chip sequence, also referred to as spread data. The PN coded chip sequence is transmitted via an antenna so as to represent a transmitted PN coded sequence as shown at 108.

FIG. 1A also illustrates a receiver system or assembly, shown generally at 150. The receiver system 150 includes a receive filter 152, a despreading function 154, a bandpass filter 156 and a demodulator 158. The PN coded data 108 is received via an antenna and is filtered by the filter 152. Thereafter, the PN coded data is decoded by a PN code despreading function 154. The decoded data is then filtered and demodulated by the filter 156 and the demodulator 158 respectively to reconstitute the original data bits 101. To receive the transmitted spread data, the receiver system 150 must be tuned to the same predetermined carrier frequency and be set to demodulate a BPSK signal using the same predetermined PN code.

More specifically, to receive a SS transmission signal, the receiver system must be tuned to the same frequency as the transmitter assembly to receive the data. Furthermore, the receiver assembly must use a demodulation technique which corresponds to the particular modulation technique used by the transmitter assembly (i.e. same PN code length, same chipping rate, BPSK). Because mobile terminals communicate with a common base station, each device in the cellular network must use the same carrier frequency and modulation technique.

A drawback associated with current cellular communication systems is that PN code parameters such as PN code length and chipping rate must be selected to provide performance based on average communication range and average noise conditions. The data rate/range tradeoff leads to a cell size/throughput tradeoff in the communication system. The rate that each transmission occurs will limit the size of each cell. Thus, it would be desirable to have a cellular communication system wherein PN code parameter, modulation complexity and other transmitting and receiving parameters could be dynamically modified for each transmission based on distance between the transmitter and receiver and noise conditions such that an improved data transmission rate for that transmission could be achieved thereby enhancing system performance.

SUMMARY OF THE INVENTION

The present invention includes an apparatus and a process for enhancing the performance capabilities of a cellular communication system utilizing DSSS techniques. The cellular communication system of the present invention includes a plurality of mobile terminals and a plurality of base stations. The base stations may be connected to a hardwired network backbone or serve as wireless base stations. Each base station can transmit and receive data in its respective cell. For a given communication between a mobile terminal and a base station, the mobile terminal and the base station can adjust the PN code length and the chipping rate depending on communication conditions to increase the transmission rate while retaining an acceptable error rate. Moreover, the system also provides that system components can adjust between other cellular communication system transmission parameters such as between different modulation schemes and/or different transmitter power levels in conjunction with PN code adjustments to further enhance the performance capabilities of the system.

Each base station and mobile terminal of the cellular communication system or network of the present invention includes a transmitter system and a receiver system. Furthermore, each transmitter system and receiver system preferably is capable of, respectively, transmitting or receiving PN coded signals formed with PN codes having different code lengths and chipping rates. Accordingly, as conditions of the wireless communication link between the base station and mobile terminal change, the present invention advantageously may adjust the PN code values to obtain the best available data rate possible for the current range and noise conditions thereby optimizing the performance capabilities of the cellular communication system as a whole.

In a first illustrative example, when a mobile terminal and a base station are located in relatively close proximity to each other, the system in accordance with the present invention may select and utilize a short PN code length (e.g., eleven chips per original data bit) resulting in a relatively fast data transmission rate. The short PN code length will result in a relatively low processing gain and a corresponding decreased communication range. However, because the base station and mobile terminal are close in proximity, the decreased communication range does not significantly increase the error rate. If the mobile terminal moves away from the base station such that the terminal is outside a communication range or cell when communicating using the short PN code length, the cellular communication system of the present invention recognizes the changing conditions and the base station and mobile terminal suitably increase the PN code length (e.g., to twenty-two chips per original data bit) to provide for a higher processing gain and thereby greater communications range. The greater processing gain afforded by the longer PN code length reduces the data transmission rate. Despite the slower transmission rate between the mobile station terminal and the base station, however, the overall exchange of data between the base station and all other mobile terminals will not be effected unless this base station is operating close to full capacity. Therefore, in most instances, the reduced transmission rate between a specific mobile terminal and a base station should have little effect on the communication system as a whole.

On the other hand, when a mobile terminal and a base station are in need of a fast data transmission rate and conditions otherwise permit, the mobile unit and base station according to the present invention may select a PN code having a relatively rapid chipping rate value (e.g. 22 MHz). If the spectral bandwidth needs to be decreased due to, among other reasons, excessive noise on closely situated frequency bands, the mobile units and base stations may decrease the chipping rate (e.g. to 11 MHz) to decrease the required transmission bandwidth. In this case, the data transmission rate is reduced commensurate with the narrower bandwidth.

In a second embodiment of this invention, each base station and mobile terminal of a cellular communication system or network may or may not be capable of varying their respective chipping rates and PN code lengths. Therefore, a cellular network is provided in which PN code values are dynamically modified based on the capabilities of the respective transmitters and receivers.

For example, a base station capable of dynamically varying PN code values may be communicating with a closely positioned mobile terminal which transmits and receives data only at a single, predetermined PN code length and chipping rate. Although a shorter PN code length could be selected based on the close range, the mobile terminal may be incapable of supporting the shorter PN code length. Therefore, the PN code length supported by the mobile terminal is utilized.

In another aspect of the present invention, additional system modulation parameters may be altered by system components to optimize the data transmission rate/range tradeoff for each communication. For example, in a situation where a high data transmission rate is required, a base station may select to use a high order modulation scheme, for example, 16 QAM, 32 QAM, etc. In a situation where an increased cell size, lower transmitter power and/or a lower data error rate is required, the base station may select a lower order modulation scheme (e.g., BPSK, QPSK, etc.).

In yet another aspect of the present invention, transmission power is also selectable by system components. Thus, in a situation where a strong PN coded signal is necessitated because the mobile terminal is relatively distant from the base station, the present invention may select to use a high power level to transmit the PN coded signal. Conversely, if the battery of a mobile terminal is running low, the present invention may select a lower power level to transmit the PN coded signal in order to conserve the battery's energy. Also, where the mobile terminal is located in very close proximity to the base station, the present invention may select to use an even lower power level to transmit the PN coded signals back and forth between the communication devices so that the receivers of each device are not saturated.

In yet a further aspect of the present invention, the system components may also select to transmit and receive PN coded signals using a variety of antennas having different gain and directivity characteristics. For example, where a base station is positioned in the center of a cell, the present invention may select to use an omnidirectional antenna so that the base station may transmit and receive signals in all directions. In another example, where a base station is to communicate a longer distance, the present invention may select to use a yagi directional antenna so that the base station may transmit a signal with a higher gain.

According to another feature of the invention, the wireless base stations may be supplied power through a solar power system having solar panels, charging circuitry and a battery system. This obviates the need for trenching in order to bury power lines and/or suspending power lines as discussed above in connection with conventional practices.

According to one aspect of the invention, a cellular communication system is provided which includes: a plurality of base stations coupled to a system backbone, each of the base stations comprising a base station receiver system for receiving wireless communications and a base station transmitter system for transmitting wireless communications; and a plurality of mobile terminals each for communicating with the system backbone by way of at least one of the plurality of base stations, each of the plurality of mobile terminals having a mobile terminal transmitter for transmitting wireless communications to the at least one of the plurality of base stations and a mobile terminal receiver system for receiving wireless communications from the at least one of the plurality of base stations; wherein, with respect to at least one of the mobile terminals, at least one of the mobile terminal transmitter system and the mobile terminal receiving system wirelessly communicates with the at least one of the plurality of base stations by selectively transmitting or receiving data according to any of a plurality of different PN code parameters.

According to another aspect of the present invention, a cellular communication system is provided which includes: a plurality of base stations coupled to a system backbone, each of the base stations comprising a base station receiver system for receiving wireless communications and a base station transmitter system for transmitting wireless communications; and a plurality of mobile terminals each for communicating with the system backbone by way of at least one of the plurality of base stations, each of the plurality of mobile terminals having a mobile terminal transmitter for transmitting wireless communications to the at least one of the plurality of base stations and a mobile terminal receiver system for receiving wireless communications from the at least one of the plurality of base stations; wherein, with respect to at least one of the mobile terminals, at least one of the mobile terminal transmitter system and the mobile terminal receiving system wirelessly communicates with the at least one of the plurality of base stations by selectively transmitting or receiving data according to any of a plurality of different transmission parameters based on communications received from the mobile terminal.

According to still another aspect of the present invention, a cellular communication system is provided which includes: a plurality of base stations coupled to a system backbone, each of the base stations comprising a base station receiver system for receiving wireless communications and a base station transmitter system for transmitting wireless communications; and a plurality of mobile terminals each for communicating with the system backbone by way of at least one of the plurality of base stations, each of the plurality of mobile terminals having a mobile terminal transmitter for transmitting wireless communications to the at least one of the plurality of base stations and a mobile terminal receiver system for receiving wireless communications from the at least one of the plurality of base stations; wherein, with respect to at least one of the mobile terminals, at least one of the mobile terminal transmitter system and the mobile terminal receiving system wirelessly communicates with the at least one of the plurality of base stations by selectively transmitting or receiving data according to any of a plurality of different transmission parameters; and wherein at least another one of the mobile terminals cannot vary any of its transmission parameters.

In accordance with yet another aspect of the invention, a cellular communication system is provided which includes: a plurality of base stations coupled to a system backbone, each of the base stations comprising a base station receiver system for receiving wireless communications and a base station transmitter system for transmitting wireless communications; and a plurality of mobile terminals each for communicating with the system backbone by way of at least one of the plurality of base stations, each of the plurality of mobile terminals having a mobile terminal transmitter for transmitting wireless communications to the at least one of the plurality of base stations and a mobile terminal receiver system for receiving wireless communications from the at least one of the plurality of base stations; wherein, with respect to the at least one base station, at least one of the base station transmitter system and the base station receiving system wirelessly communicates with one of the mobile terminals by selectively transmitting or receiving data according to any of a plurality of different PN code parameters.

According to but another aspect, a cellular communication system is provided which includes: a plurality of base stations coupled to a system backbone, each of the base stations comprising a base station receiver system for receiving wireless communications and a base station transmitter system for transmitting wireless communications; and a plurality of mobile terminals each for communicating with the system backbone by way of at least one of the plurality of base stations, each of the plurality of mobile terminals having a mobile terminal transmitter for transmitting wireless communications to the at least one of the plurality of base stations and a mobile terminal receiver system for receiving wireless communications from the at least one of the plurality of base stations; wherein, with respect to the at least one base station, at least one of the base station transmitter system and the base station receiving system wirelessly communicates with one of the mobile terminals by selectively transmitting or receiving data according to any of a plurality of different transmission parameters.

In accordance with still another aspect, a cellular communication system is provided which includes: a plurality of base stations coupled to a system backbone, each of the base stations comprising a base station receiver system for receiving wireless communications and a base station transmitter system for transmitting wireless communications; and a plurality of mobile terminals each for communicating with the system backbone by way of at least one of the plurality of base stations, each of the plurality of mobile terminals having a mobile terminal transmitter for transmitting wireless communications to the at least one of the plurality of base stations and a mobile terminal receiver system for receiving wireless communications from the at least one of the plurality of base stations; wherein, with respect to the at least one base station, at least one of the base station transmitter system and the base station receiving system wirelessly communicates with one of the mobile terminals by selectively transmitting or receiving data according to any of a plurality of different transmission parameters; and wherein at least another one of the base stations cannot vary any of its transmission parameters.

According to yet another aspect, a mobile terminal for use in a cellular communication system having at least one base station coupled to a system backbone is provided, the mobile terminal including: a transmitting system for wirelessly communicating data to the base station; and a receiving system for wirelessly receiving data from the base station, wherein at least one of the transmitting system and the receiving system wirelessly communicates with the base station by selectively transmitting or receiving data according to any of a plurality of different transmission parameters based on communications received from the at least one of the plurality of base stations.

In accordance with still another aspect, a base station coupled to a system backbone for use in a cellular communication system is provided, the base station including: a transmitting system for wirelessly communicating data to a mobile terminal included in the cellular communication system; and a receiving system for wirelessly receiving data from the mobile terminal; wherein at least one of the transmitting system and the receiving system wirelessly communicates with the mobile terminal by selectively transmitting or receiving data according to any of a plurality of different transmission parameters based on communications received from the at least one of the plurality of base stations.

According to still another aspect, a method of wireless communication between a mobile terminal and a base station in a cellular communication system is provided, including the steps of: the mobile terminal transmitting data to the base station according to a first transmission parameter and determining if the data has been validly received; and the mobile terminal automatically transmitting data to the base station according to a second transmission parameter which is different from the first transmission parameter if the data is determined not to have been validly received.

According to yet another aspect, a wireless base station for use in a cellular communication system having a system backbone is provided, comprising: a communication system for performing wireless communications with devices in the cellular communication system, including communicating with the system backbone by way of wireless communications: and a power supply for providing power to operate the wireless base station, the power supply including a solar power device for deriving the power from solar energy.

In accordance with but another aspect of the invention, a wireless base station for use in a cellular communication network having a system backbone is provided, including: a communication system for performing wireless communications with devices in the cellular communication network, said communication system receiving and transmitting wireless communication between a first device and a second device in the cellular communication network; and an error correction system for correcting data errors in the wireless communication received by the communication system prior to the communication system transmitting the wireless communication.

In accordance with still yet another aspect of the invention, a wireless base station for use in a cellular communication system is provided, including: a transceiving system for performing wireless communications with devices in the cellular communication system, said transceiving system being adapted for receiving and transmitting wireless communication between a first device and a second device in the cellular communication system; said transceiving system having a first antenna, a second antenna and antenna selection circuitry, wherein said antenna selection circuitry selects one of said first antenna and second antenna for at least one of said receiving and transmitting wireless communication.

The aforementioned features and other aspects of the present invention are described in more detail in the detailed description and accompanying drawings which follow.

DETAILED DESCRIPTION OF THE INVENTION

Figure 1:
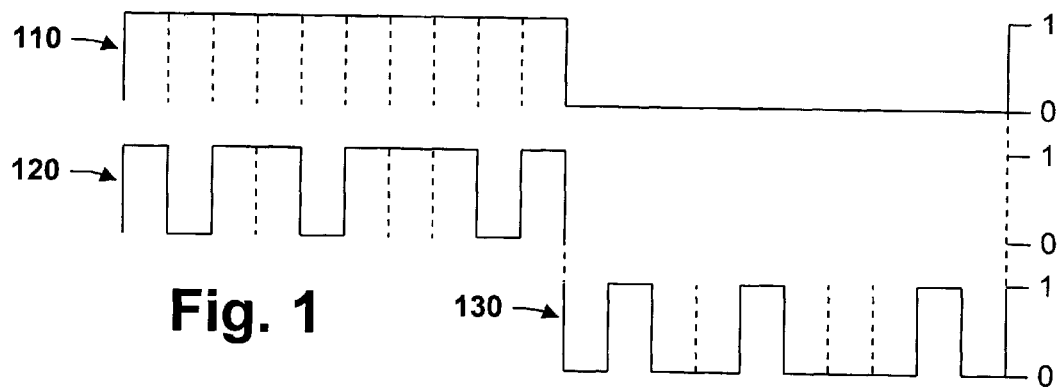
FIG. 1 is a schematic representation of a PN coded signal for data bits "0" and "1"
Figure 1A:
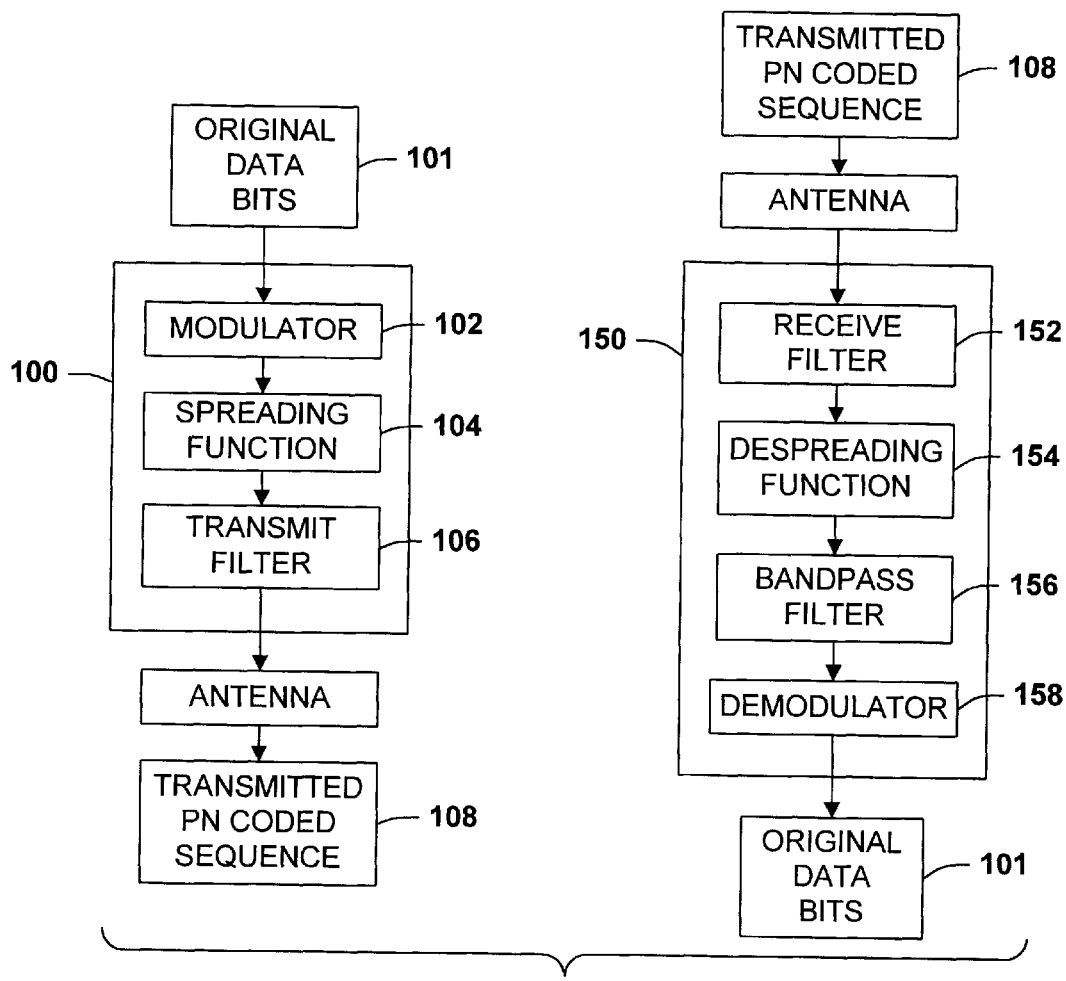
FIG. 1A is a schematic representation of a transmitter system and a receiver system of a DSSS communication system.
Figure 2:
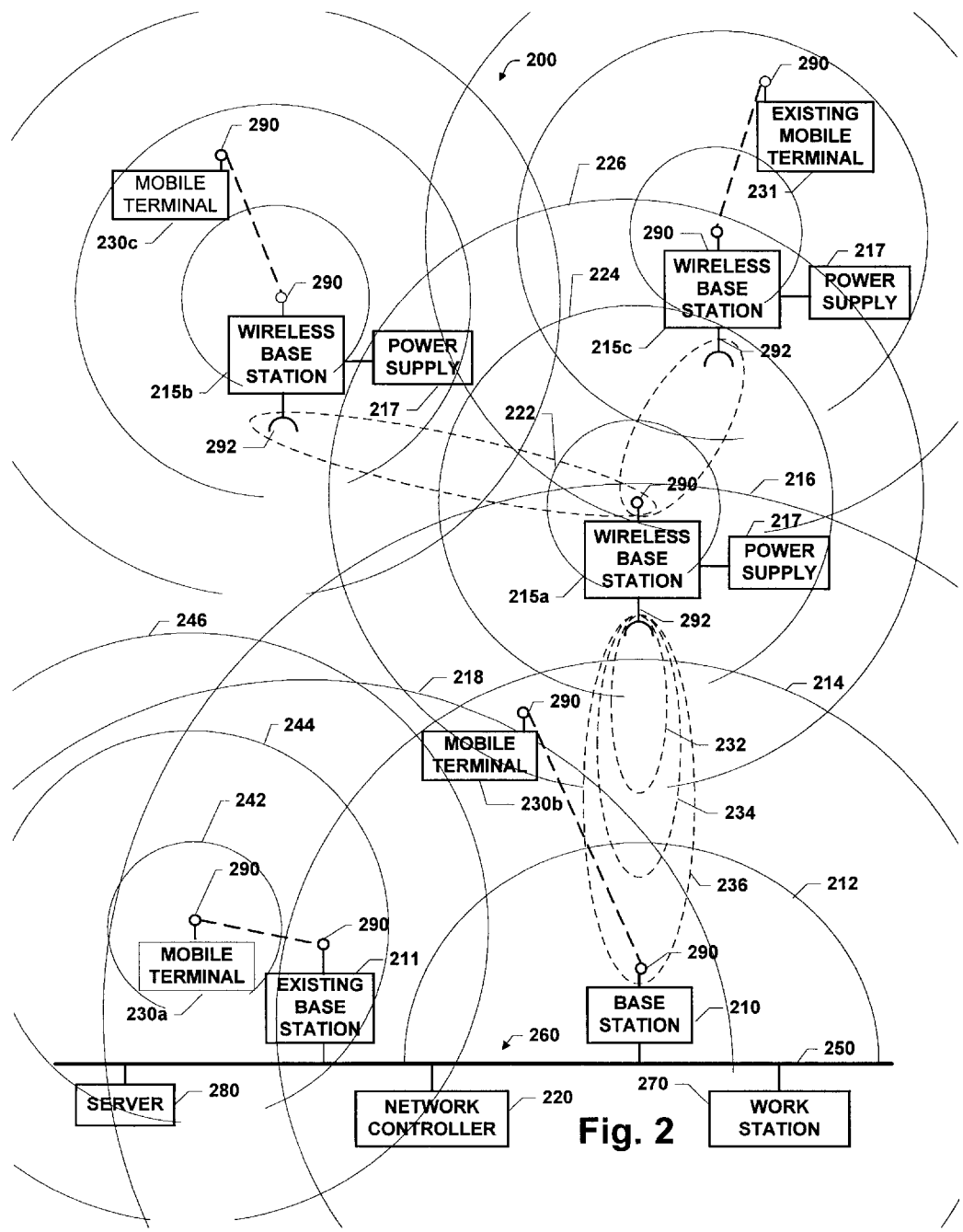
FIG. 2 is a schematic representation of a cellular communication system of the present invention.

FIG. 2 schematically illustrates a cellular communication system, shown generally at 200, in accordance with the present invention. The cellular communication system 200 may be one of several types including a local area network (LAN) or a wide area network (WAN).

The cellular communication system 200 of this exemplary embodiment has a network 250 which forms a hardwired data communication path. The hardwired data communication path may be made of a twisted pair cable, shielded coaxial cable or fiber optic lines, for instance, and is often referred to as the system backbone 260. Connected to the system backbone 260 is a base station 210 which is capable of dynamically modifying one or more of its data transmission parameters in accordance with this invention. Also connected to the system backbone 260 is a conventional base station 211 having generally fixed data transmission parameters. Each base station 210, 211 wirelessly communicates with other devices in the system 200 via an omnidirectional antenna 290 which allows for a generally spherical area of coverage. Directional yagi type antennas or other forms of antennas could also readily be used as will be appreciated. The antenna 290 allows each base station 210, 211 to transmit and receive data within a respective geographic cell. As is discussed below, the cell size is the geographic area in which a device can communicate with another device in a cellular communication system 200. The present invention permits the base station 210 to adjust effectively its cell size in order to better optimize overall system performance. The adjustability of the cell size of base station 210 is schematically illustrated by curved lines labeled 212, 214, 216 (corresponding to a fast, mid, and slow data transmission rate, respectively). Conventional base station 211 has a fixed cell 218 associated with it, wherein cell 218 is of the mid cell size in this particular embodiment. The cellular communication system 200 generally will have several dynamic base stations 210 and/or several conventional base stations 211 spaced apart along the system backbone 260. However, for purposes of illustration and simplicity, only one of each is shown in this embodiment.

Other components of the system 200 that may be wired to the backbone 260 include a client/server network composed of a work station (client) 270, such as an IBM compatible personal computer, and a server 280, such as an IBM RS/6000. A network controller 220 may also be wired to the backbone 260 to control the flow of data between the base station 210 and other components wired to the backbone 260. The network controller 220 may communicate with the components wired to the backbone 260 using a variety of protocols, such as the Ethernet protocol or the Token Ring protocol.

In order to expand the effective communication range of base stations 210, 211 connected to the network, several wireless base stations designated 215a, 215b, and 215c are included in the cellular communication system 200. When referenced collectively, wireless base stations 215a, 215b, and 215c will hereinafter be referred to as wireless base station 215. Each wireless base station 215 is shown to have a power supply 217. The power supply 217 may be hardwired to an existing power source via power lines or, it may be an auxiliary power source in accordance with the invention. Such an auxiliary power source may use solar power, as is described below, or it may use other natural energy sources such as wind or water.

In this particular embodiment, each wireless base station 215 is shown to have connected to it both an omnidirectional antenna 290 and a yagi type directed antenna 292. The omnidirectional antennas 290 allow for a spherical area of coverage, whereas the yagi type antennas 292 allow for a more elongated, elliptical shaped cell coverage. The yagi type antennas 292 are commonly used when communication is maintained with another device having a fixed location in order to allow for longer distance coverage. Similar to the base station 210 mentioned above, each wireless base station 215 of this invention can vary its cell size to allow for optimal settings. For example, wireless base station 215a is shown to have an omnidirectional antenna 290 which provides for cell area coverage illustrated by circular lines 222, 224, 226 and a yagi type antenna 292 which allows for directed cell area coverage illustrated by elliptical lines 232, 234, 236. In other embodiments, it is likely that a wireless base station may be configured to operate with one antenna. Although not completely shown or labeled for the sake of simplicity, wireless base stations 215b and 215c have similar cell area coverage.

The cellular communication system 200 also includes one or more mobile terminals each referred to generally as a mobile terminal 230. The mobile terminals 230 are each capable of dynamically modifying their data transmission parameters in accordance with the invention as is described more fully below. In this particular embodiment, three mobile terminals designated 230a, 230b, 230c are communicating with devices connected to the network 250. Also shown within the cellular communication system is a conventional mobile terminal 231 with generally fixed parameters. The mobile terminals 230, 231 are capable of roaming from cell to cell and using a registration and deregistration process to assure a single entry point to the backbone 260, as is described in more detail below. The mobile terminals 230, 231 may include a hand held or arm mounted portable computer, or a portable data form reader mounted to a vehicle, for example.

Connected to each mobile terminal 230, 231 is an omnidirectional antenna 290. Omnidirectional antennas allow for a generally spherical cell area coverage which is often beneficial for roaming mobile terminals, however other types of antennas could readily be used. In accordance with the exemplary embodiment of this invention described herein, each mobile terminal 230 has an adjustable cell size as is representatively indicated by cells 242, 244, and 246 (corresponding to fast, mid, and slow data transmission rate, respectively) as illustrated with respect to mobile terminal 230a. The cell coverage of the mobile terminals 230b, 230c, and conventional mobile terminal 231 are not shown in FIG. 2 for sake of clarity. However, in order to maintain proper communication with a particular base station 210, 211, or 215 it is not enough that the mobile terminal be within the cell area coverage of the base station, but rather, the base station must also be within the cell area coverage of the mobile terminal as will be appreciated.

For example, in this particular embodiment, mobile terminal 230a is shown to be within the cell area coverage 218 of base station 211. However, in order to maintain proper bidirectional communication and register with base station 211, the base station 211 must also be within the cell area coverage of the mobile terminal 230a. As shown, at the fastest data transmission rate, mobile terminal 230a only has transmission capabilities within cell 242 which is not sufficient to communicate with base station 211. Therefore, the mobile terminal 230a must communicate at the mid or slow rate corresponding to cell coverage 244, 246 respectively. At these rates, the base station 211 falls within the transmission range of mobile terminal 230a. Thus, registration and communication can be readily maintained.

In many instances, a mobile terminal may register with a wireless base station 215 in order to gain access to the network 250. Similar to that discussed above, both the mobile terminal and the wireless base station must be within each others transmission range in order to allow for proper communication to take place. As is discussed below, each wireless base station 215 will form a permanent path to the network 250 through which all communication with registered mobile terminals take place. In this particular embodiment, wireless base station 215b has formed a permanent path to the network 250 through wireless base station 215a and base station 210. Thus, if mobile terminal 230c is registered with wireless base station 215b then all communication between the mobile terminal 230c and the network 250 will follow this path.

Transmissions between the devices in the cellular communication system 200 preferably occur in a packet format 300 (FIG. 3) using Spread Spectrum wireless communication techniques, as described in the Background section. Although this particular embodiment describes a Direct Sequence Spread Spectrum (DSSS), a frequency hopping system or a hybrid system using direct sequence or frequency could be readily employed. In order to accommodate varying cell sizes in a DSSS system as discussed above, the mobile terminals 230 and the base stations 210, 215 are capable of varying PN code parameters such as PN code length and chipping rates, and modulation complexity for example. The effect of varying each of these parameters will now be discussed in conjunction with their effect on cell size and overall system performance.

As indicated previously in the background section, a longer PN code length results in a higher processing gain and correspondingly increases a communication range between a mobile terminal 230 and a base station 210, 215. On one hand, a high processing gain may advantageously be utilized to permit data transmission between the mobile terminal 230 and the base station 210, 215 that would otherwise be out of the communication range. However, the increased communication range afforded by the high processing gain results in a reduced data transmission rate (where the data transmission rate is measured in terms of original data bits transmitted per unit time). On the other hand, a lower processing gain may be utilized to achieve a faster data transmission rate between a mobile terminal 230 and a base station 210, 215 which are nearby. The lower processing gain, however, reduces the communication range between the mobile terminal 230 and the base station 210, 215.

The chipping rate refers to the rate at which chips are transmitted by the system component sending a data transmission. A system component receiving the data transmission must receive, demodulate and despread the PN coded chip sequence at the chipping rate utilized by the sending component. At a higher chipping rate, the receiver system is allotted a smaller amount of time to receive, demodulate and despread the chip sequence. As the chipping rate increases so to will the error rate. Thus, a higher chipping rate effectively reduces the communication range. Conversely, decreasing the chipping rate increases the communication range.

In addition to modifying the PN code length and chipping rate, the modulation complexity may be varied. A BPSK modulation scheme, which provides for modulating the carrier to one of two phases, may be used to transmit one bit at a time over the wireless communication link, while a QPSK modulation scheme, which provides for modulating the carrier to one of four phases may be used to transmit data at a faster rate, two bits at a time, over the link. While QPSK will result in a faster data rate, it is more sensitive to noise and more errors may occur because the receiver must operate within a 90 degree phase decision angle rather than 180 degrees associated with BPSK. Thus, a greater transmission range can also be accomplished by using a BPSK modulation complexity over a QPSK modulation complexity since BPSK modulation has a higher tolerance to noise and allows for better opportunities to decode each bit.

While the rate/range tradeoff still applies to each individual transmission, the system 200 allows an individual mobile terminal 230 and an individual base station 210, 215 to optimize the processing gain and data transmission rate tradeoff for a given data transmission. This overcomes the cell size/throughput tradeoff limitation. It will be apparent that the system 200, by providing the base stations 210, 215 and the mobile terminals 230 with the ability to dynamically modify the PN code length, chipping rate, and/or modulation complexity effectively provides a base station 210, 215 with an adjustable cell size as indicated in FIG. 2. For instance, the cell size indicated by the curved line 212 of base station 210 would correspond to a data transmission characterized by a low processing gain and a high data transmission rate. The cell size indicated by the curved line 214 would correspond to a data transmission characterized by an intermediate processing gain and intermediate data transmission rate. Finally, the cell size indicated by the curved line 216 would correspond to a data transmission characterized by a high processing gain and a low data transmission rate. The present system 200 can have exceptionally large cells while only sacrificing throughput to the extent mobile terminals on the fringe of respective base station cells require the higher processing gain for error free communication.

Optimization of a wireless communication link occurs when all parameters are set such that data is transmitted at the fastest possible rate to the system backbone 260 at or below an "acceptable" error rate given the capabilities of the communicating system components, the range of data transmission and the ambient noise conditions. However, in obtaining this optimum setting, tradeoffs will occur as discussed above.

One advantage of dynamically altering the communication parameters to optimize performance is that mobile terminals 230 close to a base station 210, 215 may transmit data rapidly thereby reducing total air time usage. Additionally, fewer base stations will likely be needed to cover a given service region, thereby reducing the overall cost associated with the cellular communication system. Without the ability to dynamically alter communication parameters, the base station cell sizes remain constant. Thus, it will be necessary to ensure that there are a sufficient number of base stations located so as to cover the entire service region. It should be evident in such situations that, unless each base station is preset to transmit at its lowest possible data communication rate, the base station cell size will be less than a cell size defined by its maximum range capabilities. However, given the rate/range tradeoff (as discussed above), it would be extremely inefficient usage of air time to set the slowest rate on most base stations, which consequently would correspond to a need for a greater number of base stations in order to cover any given area. Additionally, by having this dynamic altering ability, base stations may be able to adjust for additional noise introduced into their communicating area. Without this ability, newly introduced noise could result in reduced range or "dead spots" where a mobile terminal can no longer communicate with any preexisting base station.

In order to allow for optimization of a cellular communication system, each base station 210, 215 in the exemplary embodiment is capable of communicating with a plurality of mobile terminals 230 at three different data rates, fast, mid and slow. In other embodiments, a variety of rates variably adjustable between the slowest and fastest rate could be used. Because of the rate/range tradeoff, the fast rate can only be used to communicate with mobile terminals 230 located relatively close to a base station 210, 215. A cell 212 (FIG. 2), for example, in which the fast rate can be used is referred to as the near zone. The mid data rate can be used to communicate with mobile terminals 230 which are more distant from the base station 210, 215. For example, in cell 214 the mid data rate can be used, but not the fast data rate. Finally, a mobile terminal 230 that is even more distant from a base station 210, 215 requires data transmission at the slow data rate.

In this particular embodiment, the fast data rate includes use of an 11 chip PN code and a QPSK modulation complexity. The chipping rate can be set to 11 MHZ to provide a 2 MB/sec data rate. The mid data rate includes use of an 11 chip code and a BPSK modulation complexity. An 11 MHZ chipping rate will provide a 1 MB/sec data rate. The slow data rate includes a 22 chip code and a BPSK modulation complexity. The 11 MHZ chipping rate provides a ½ MB/sec data rate. Table 1 below summarizes such parameters. It will be appreciated, of course, that such values are exemplary and are not intended to limit the scope of the invention.

TABLE I

| Data Rate | PN Code Length (chips) | Chip Rate (MHZ) | Modulation |
|---|---|---|---|
| Fast | 11 | 11 | QPSK |
| Mid | 11 | 11 | BPSK |
| Slow | 22 | 11 | BPSK |

To eliminate the need for each system component (mobile terminal 230 or base station 210, 215) to have a receiver system capable of simultaneously listening for data transmitted at all three data rates, a network protocol provides for a more simplified receiver system. The preferred network protocol incorporates a combination of positive and negative acknowledgment signals used by a responding component. The acknowledgment signals provide information to a transmitting component that allows the transmitting component to change its parameters in a manner which optimizes the communication link. A positive acknowledgment signal is returned to the transmitting component when the receiving component properly received all of the transmitted data. Thus, a positive acknowledgment signal informs the transmitting component that its current transmitting parameter settings are sufficient to allow for communication. However, based on the information given in the acknowledgment, more optimal settings may be available. A negative acknowledgment signal is used when the receiving component only partially received the transmitted data. A negative acknowledgment signal informs the transmitting component that its current transmitting parameter settings are not sufficient to allow for proper communication. However, the transmitting component can use the information given in this acknowledgment signal to change its parameters (if possible) to allow for complete and optimal communication to take place.

In the preferred embodiment of this system 200, it is desirable to enable the mobile terminal 230 to choose the data rate or data rates used for the packet. Base stations 210 hardwired to the system backbone 260 and wireless base stations 215, are programmed to respond to the mobile terminal at the same rate or rates. Therefore, the mobile terminal receiver system will be able to anticipate the rate of the incoming signals at any one time.

The base station 210, 215, on the other hand, will not know which data rate the mobile terminal 230 will choose, or which of several mobile terminals will transmit a packet. Therefore, the base station 210, 215 would ordinarily be required to simultaneously be able to detect all three data rates. To provide for a more simplified base station 210, 215 receiver system, however, the network protocol requires all packets to begin with a header 302 (FIG. 3A) transmitted at the mid or slow data rate. Therefore, the base station 210, 215 need only listen for the mid or slow rates as is explained more fully below in connection with FIGS. 3B and 3C.

Figure 3A:
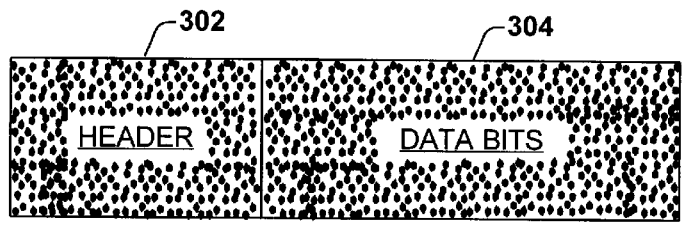
FIG. 3A is a schematic representation of a data packet including a header portion and a data portion.

Referring to FIG. 3A, each packet 300 preferably includes overhead bits in the form of a header 302 and a plurality of data bits 304. While the entire packet 300 may be transmitted at the fast, mid or slow rate, the protocol of this specific embodiment provides for the header to be transferred at the mid or slow rate while the data portion is transferred at the fast, mid or slow rates. Any combination of these varying rates in a single packet may be referred to as a packet rate. The header 302 may include receiver system setup data signifying the data rate at which the data bits 304 will be transmitted. The packet 300 may contain synchronization bits (not shown) between the header and data portion to provide the receiver time to reconfigure itself to the data transmission rate for the data bits 304.

A conventional mobile terminal 231 which cannot change its parameters need only be configured in the exemplary embodiment to operate at the mid rates by preselecting its one non-adjustable PN chip code length characteristic value to 11 chips and its modulation complexity to BPSK. Accordingly, the header and data of a packet 300 are always transmitted by the mobile terminal 231 to the base station at the mid data rates.

Because the mobile terminals 230 may transmit headers 302 of the packets 300 to the base station 210, 215 at either the mid rate or the slow rate the modulation complexity of the header is always BPSK. Therefore, the receiver system of base stations that communicate with the mobile terminals 230 are configured initially to receive BPSK signals, in that it distinguishes between the two possible phases of the carrier frequency. However, the mid data rate has an 11 chip PN code length and the slow data rate has a 22 chip PN code length. Therefore, the base station must be able to determine which of the two PN codes is in use to determine whether the header 302 is being transmitted at the mid or slow data rates. Consequently, as described below in connection with FIG. 3C the base station 210 includes at least two PN decoders serving as correlation channels, one to correlate when an 11 chip PN code length is used and the second configured to detect and decode a 22 chip PN code length. In response to a header 302 indicating that the accompanying data bits 304 of the packet 300 are to be communicated using the fast data rate, the base station 210 reconfigures to receive QPSK modulation and the incoming data is correlated with an 11 chip PN code as discussed below.

Wireless base stations 215 which do not directly communicate with mobile terminals generally do not have to continuously be able to detect different data rates. However, due to their start up procedure, as is discussed below, they are configured so as to be able to receive information at different rates. Further, wireless base stations such as base station 215a in FIG. 2 may optionally be configured to communicate with mobile terminals as well as serve as an intermediate link between other wireless base stations and the network. For instance, a manual switch (not shown) may be attached to the wireless base station and control whether the wireless base station responds to a request to register signal sent from a mobile terminal. Alternatively, the wireless base station could be configured such that a program stored in the memory of the wireless base station allows registration with mobile terminals only when the wireless base station is also able to effectively support loading from other wireless base stations which may have registered with it. The registration process between a wireless base station 215 and another base station 210, 211 or a wireless base station 215 and a mobile terminal 230, 231 is discussed below.

Regardless of whether or not a wireless base station is configured to permit registration with mobile terminals, the communication path between the wireless base station 215 and the other base stations 210, 211 is a fixed path. Therefore, in order to set up a permanent communication path, at start up each wireless base station sends out a request to register with a base station closer to the system backbone. The request to register is initially sent at the fastest speed. If a response is received at the fast rate, the wireless base station will establish a permanent communication link with the responding base station. If no response is received, the wireless base station will send out a request to register at a slower speed. This process will continue until a permanent communication link is created. If at any time, more then one base station responds to the wireless base station's request to register, the wireless base station will select one of the responding base stations to be its permanent link to the backbone based on predetermined criteria such as system load, for example.

It should be readily understood that there can be several embodiments of the mobile terminal 230 of the present invention. Different embodiments may have different limitations on the parameters used to vary the processing gain. For example, a first embodiment may be capable of varying PN code length and modulation complexity in accordance with all three data rates. In another more limited embodiment, the mobile terminal 230 may be capable of varying the modulation complexity but not the chip PN code length. When such embodiment is set for an 11 chip PN code, it is capable of the fast and mid data rates.

The network of this invention can also support conventional base stations 211 and base stations 210, 215 with limited ability to alter code length or modulation complexity.

The capabilities of both the mobile terminal 230 and the base station 210, 215 limit the data rates that the mobile terminal 230 can choose. The base station may include its rate capabilities in the "OK to register" packet, often referred to as the "router identification" packet, and the mobile terminal 230 will comply with the base station's rate limitations when choosing a data rate.

In summary, the preferred embodiment of the cellular communication system 200 of the present invention utilizes a packet structure with a mid or slow data rate used for the header 302 and a fast, mid or slow data transmission rate used for the data bit portion 304 of the packet 300. The mobile terminal 230 chooses the packet data transmission rates and the base station response packet will use the same rates. At start up, wireless base stations 215 establish a permanent link to the system backbone 260 and maintain constant optimal communication with hardwired base stations 210 or other wireless base stations 215 situated closer to the backbone 260.

Figure 3B:
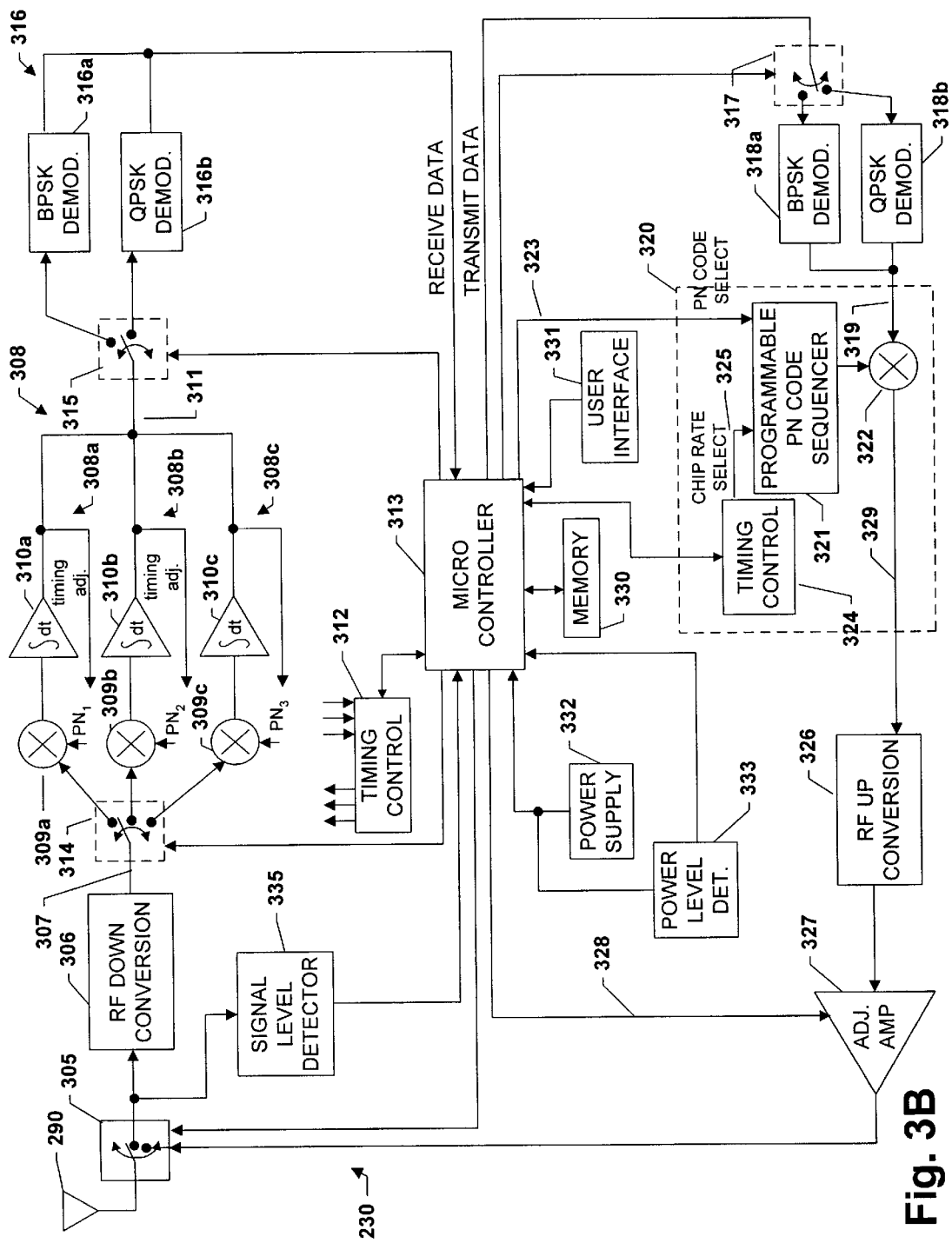
FIG. 3B is a detailed block diagram of an exemplary embodiment of a mobile terminal in accordance with the present invention.

Referring now to FIG. 3B, a detailed block diagram of an exemplary embodiment of a mobile terminal 230 is shown in accordance with the present invention. The mobile terminal 230 includes the aforementioned antenna 290 which is used both for transmitting and receiving data. The antenna 290 is connected to the antenna terminal of a receive/transmit switch 305. The receive/transmit switch 305 can be any type switch for switching the antenna 290 between a transmitting mode and a receiving mode, for example a PIN-diode based single pole-double throw (SPDT) type switch as is known. Signals received by the antenna 290 are coupled via the switch 305 to the input of an RF down-conversion circuit 306. The RF down-conversion circuit 306 typically includes a mixer and can be of any known suitable design for outputting the data signal onto line 307.

The mobile terminal 230 includes a bank 308 of PN code spread spectrum decoders, each respectively being of conventional design. In the exemplary embodiment, the bank 308 includes PN code spread spectrum decoders 308a, 308b and 308c each respectively configured for decoding or despreading signals received at the fast, mid and slow data rates. For example, decoder 308a is configured to decode PN coded data having an 11 chip PN code length and a chipping rate of 11 MHZ. The decoder 308a generally includes a mixer 309a which mixes the received PN coded data with a signal $PN_1$ representing the 11 chip PN code at the 11 MHZ chipping rate. The output of the mixer 309a is provided to an integrator 310a which integrates the signal to produce a decoded data output on line 311. The output of the integrator 310a is also fed back to a timing controller 312 which produces the appropriate decoding signal PN1 and adjusts the timing thereof based on the output of the integrator 310a in order to obtain optimum correlation with the data received by the decoder.

Similarly, the decoder 308b is configured for receiving data transmitted at the mid data rate. Since the mid data rate in the exemplary embodiment also uses a PN code length of 11 and a chipping rate of 11 MHZ, the construction of the decoder 308b can be identical to that of the decoder 308a. In fact, decoders 308a and 308b in this particular embodiment can be one and the same as will be appreciated. Nevertheless, the decoder 308b similarly includes a mixer 309b, an integrator 310b, and receives an appropriate timing signal $PN_2$ from the timing controller 312. The decoder 308c also includes a mixer 309c and an integrator 310c, but is configured to receive a timing signal $PN_3$ from the timing controller 312 corresponding to a PN code length of 22 at a chipping rate of 11 MHZ.

A microcontroller 313 included in the mobile terminal 230 is programmed to carry out the various control and processing operations described herein. For example, the microcontroller 313 controls a switch 314 which determines whether the mobile terminal 230 is set to receive data at the fast, mid or slow data rate by respectively coupling the PN coded signal on line 307 to any of decoders 308a–308c. Similarly, the microcontroller 313 controls a switch 315 which determines what type of further demodulation is performed on the data signal. More specifically, the mobile terminal includes an array of selectable demodulators 316. Demodulators 316a and 316b are conventional and perform BPSK and QPSK demodulation, respectively. Depending on whether the mobile terminal 230 is to be set to receive data at the fast, mid or slow data transmission rate, the microcontroller 313 adjusts the position of switch 315 accordingly. If the mobile terminal 230 intends to receive data at the fast data rate, the switch 315 couples the output from the decoder bank 308 to QPSK demodulator 316b. On the other hand, if the mobile terminal 230 is to receive data at the mid or slow data rates, the switch 315 connects the signal on line 311 to the BPSK demodulator 316a. The data which is output from the demodulators 316a, 316b is then provided on the RECEIVE DATA line to the microcontroller 313 for appropriate processing based on the given application.

In order for the mobile terminal 230 to transmit data, the microcontroller 313 provides data to be transmitted onto a TRANSMIT DATA line. The TRANSMIT DATA line is connected to a controllable switch 317 which determines the manner in which the transmit data is modulated. More specifically, the mobile terminal 230 includes a bank of modulators 318 including BPSK and QPSK modulators 318a and 318b, respectively. In the event data is to be transmitted by the mobile terminal 230 at the fast rate, the microcontroller 313 causes the switch 317 to couple the transmit data to the input of the QPSK modulator 318b. Alternatively, if the data is to be transmitted at the mid or slow rates, the data is connected to the input of the BPSK modulator 318a via the switch 317.

The BPSK or QPSK modulated data from modulators 318a, 318b is output onto line 319 which serves as the input for a programmable PN encoder 320 included in the mobile terminal 230. Specifically, the PN encoder 320 includes a programmable PN code sequencer 321 which provides the appropriate PN code for mixing (via mixer 322) with the data on line 319 to be PN code modulated. The programmable PN code sequencer 321 can be any digital logic circuit designed to generate a PN code sequence at the desired chip length and chipping rate. The programmable PN code sequencer 321 of this embodiment utilizes a shift register to create the necessary PN codes. The programmable PN code sequencer 321 receives as control inputs a PN code select signal from the microcontroller 313 via line 323, and a chip rate select signal provided from a timing controller 324 via line 329. The PN code select signal defines the particular PN code to be used which, in the exemplary embodiment is either an 11 chip or 22 chip code. The chip rate select signal from the timing controller 324 determines the chipping rate of the PN code sequence produced by the sequencer 321. In the exemplary embodiment, the chip rate select signal causes the PN code sequence output from the programmable PN code sequencer 321 to have a chipping rate of 11 MHZ at all times, but another embodiment could include varying the chipping rate as will be appreciated. The timing controller 324, like the timing controller 312, is connected to the microcontroller 313 and is controlled thereby.

Accordingly, when the mobile terminal 230 transmits data at the fast or mid rates, the microcontroller 313 provides a PN code select signal on line 323 indicating that the programmable PN code sequencer 321 is to generate a PN code sequence having a PN code length of 11 and a chipping rate of 11 MHZ. When the mobile terminal 230 transmits data at the slow rate, the microcontroller 313 provides a PN code select signal to the programmable PN code sequencer 321 indicating that the programmable PN code sequencer 321 is to generate a PN code sequence having a PN code length of 22 and a chipping rate of 11 MHZ. The output of the programmable PN code sequencer 321 is provided to mixer 322 where it is mixed with the data on line 319 to produce a PN spread spectrum signal on line 329. The spread spectrum signal is then input to a conventional RF up-conversion circuit 326 which mixes the signal onto an RF carrier prior to being provided to an RF output amplifier 327. The RF signal is amplified by the amplifier 327, and the output of the amplifier is provided to the transmit terminal of the switch 305. During a transmit mode, the microcontroller 313 causes the switch 305 to couple the output of the amplifier 327 to the antenna 290 so that the signal is transmitted. During the receive mode, of course, the switch 305 is controlled by the microcontroller 313 to couple the signal from the antenna 290 to the RF down conversion circuit 306.

The RF output amplifier 327 in the preferred embodiment has an adjustable gain which is controlled by the microcontroller 313 via line 328. In the event the microcontroller 313 elects to increase the power level at which the RF signal is transmitted from the antenna 290, the microcontroller 313 can increase the gain of the amplifier 327. Conversely, if the microcontroller 313 elects to reduce the transmit power level, the microcontroller 313 reduces the gain of the amplifier 327.

In addition to the above described receiver and transmitter systems, the mobile terminal 230 includes a memory 330 which stores, for example, code which is executed by the microcontroller 313 for carrying out the functions described herein. It will be readily apparent to those having ordinary skill in the art of microprocessor programming how the microcontroller 313 can be programmed in order to carry out such functions based on the description provided herein. Furthermore, the memory 330 may include application code, data, etc., as is conventional. The mobile terminal 230 also includes a user input 331 such as a keypad, touch display, LCD, etc., which can be used for inputting or viewing information.

The mobile terminal 230 includes a power supply 332 which provides the power for operating the mobile terminal 230. Typically, the power supply 332 consists of a battery pack which is either replaceable or rechargeable. The output of the power supply 332 is monitored by a power level detector 333 which measures the voltage and/or current delivered by the power supply 332 to the mobile terminal 230. In the exemplary embodiment, the power level detector 333 detects if the voltage provided by the power supply 332 falls below a predetermined threshold. If this occurs, the power level detector 333 provides a signal to the microcontroller 313 to inform the microcontroller 313 that the power level is low. The microcontroller 313 may then take predetermined action such as reducing the transmit power level by reducing the gain of the amplifier 327, thus reducing power consumption.

Furthermore, the mobile terminal 230 includes a signal level detector circuit 335 which detects the signal level of the signal received via the antenna 290 from a base station, for example. In the preferred embodiment, the signal level detector 335 is designed to provide an output signal to the microcontroller 313 in the event the signal level of the received signal exceeds a predetermined level (thereby indicating the base station is in close proximity). Upon receiving such a signal, the microcontroller 313 may elect to reduce the gain of the amplifier 327 for transmitting information back to the base station. This enables the mobile terminal 230 to conserve power and/or avoid saturating the front end of the base station 210.

Figure 3C:
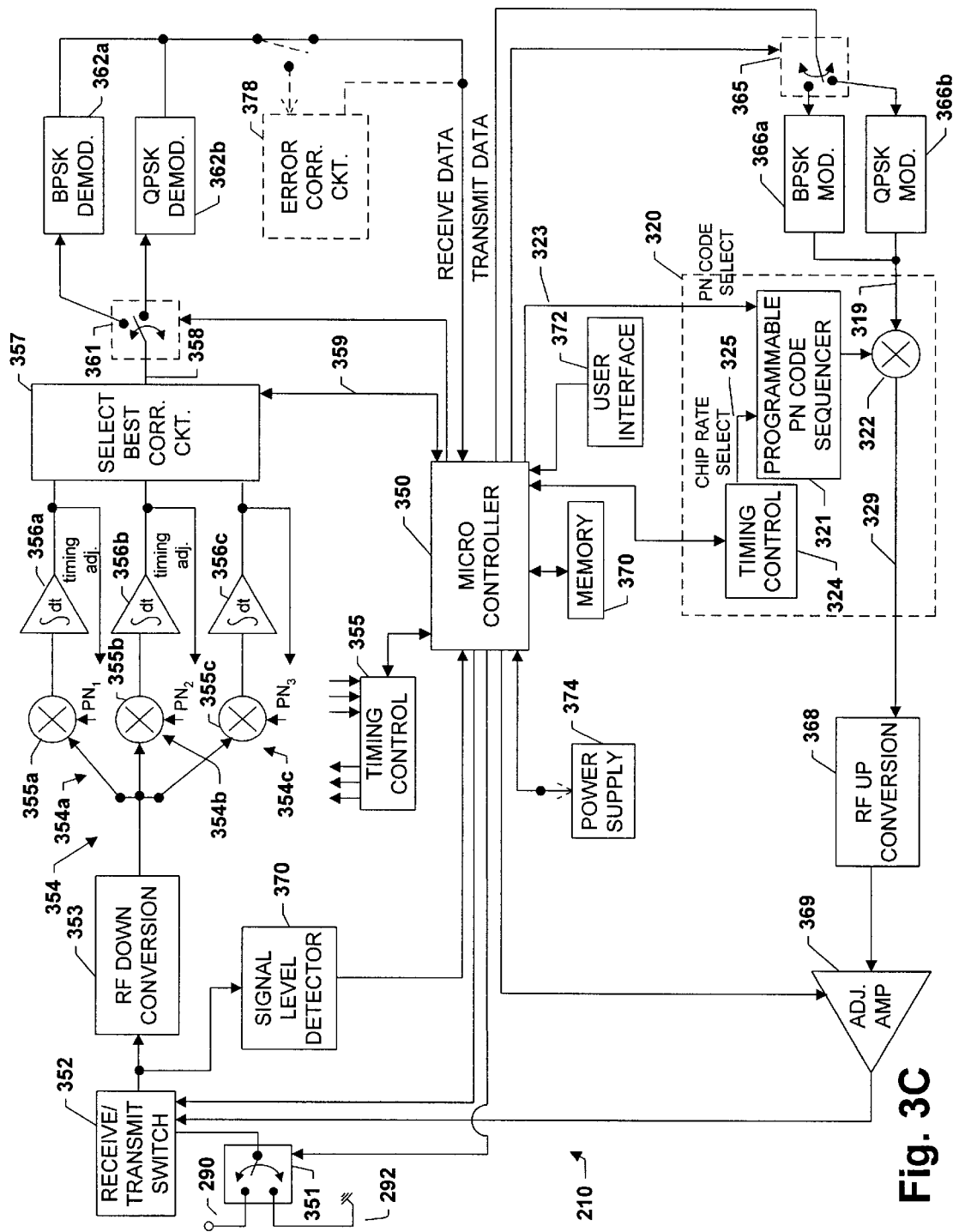
FIG. 3C is a detailed block diagram of an exemplary embodiment of a base station in accordance with the present invention.

Regarding the base station 210, FIG. 3C shows an exemplary embodiment having various aspects of the present invention. The base station 210 is driven by a microcontroller generally designated 350. As discussed above, the base station 210 may include two or more different antennas 290 and 292. Additionally, the base station 210 may include antenna selection circuitry which in this embodiment is generally represented by a microcomputer 350, and a switch 351. The microcontroller 350 determines which antenna is utilized during any particular transmission or reception by way of the switch 351 controlled by the microcontroller 350. The state of the switch 351 determines which of the antennas 290, 292 is selectively coupled to the antenna terminal of the receive/transmit switch 352. The receive/transmit switch 352 is identical in operation to the switch 305 described in connection with the mobile terminal in FIG. 3B. The output of the receive/transmit switch 352, i.e., the receive terminal, is connected to the input of an RF down-conversion circuit 353. The operation of the RF down-conversion circuit 353 is identical to that of the corresponding RF down-conversion circuit 306 in the mobile terminal 230.

Thus, RF signals which are received by the base station 210 from a mobile unit 230 are received via either antenna 290 or 292, and are input to the RF down-conversion circuit 353 via the receive/transmit switch 352. Like the transmitter system in the mobile terminal 230, the base station includes a bank 354 of PN code spread spectrum decoders 354*a*–354*c*. Each are of conventional design and together with timing controller 355 are identical in operation to the decoders 308*a*–308*c* and timing controller 312 in the mobile terminal 230, respectively. In other words, the decoders 354*a* and 354*b* are each configured according to conventional techniques to decode a PN coded spread spectrum signal having a PN code length of 11 and a chipping rate of 11 MHZ. Decoder 354*c* is configured to decode a PN coded signal having a PN code length of 22 and a chipping rate of 11 MHZ. Each decoder generally includes a mixer 355 and an integrator 356, and receives appropriate timing signals (PN1–PN3) and control via the timing controller 355.

Unlike the mobile terminal 230, however, the transmitter system of the base station 210 does not include a switch for selecting which of the decoders 354*a*–354*c* receive the output from the RF down-conversion circuit 353. This is because in the exemplary embodiment it is predetermined that the mobile terminal 230 will know that data validly received from the base station will initially be transmitted at a particular rate as discussed more fully below. Hence, the microcontroller 313 in the mobile terminal 230 knows initially how to set switches 314 and 315 such that the data is decoded in accordance with the particular data rate. The base station 210, on the other hand, does not always know the transmission rate at which data will be received. Consequently, the output from the RF down-conversion circuit 353 is input to each of the decoders 354*a*–354*c* in parallel. The outputs of each of the decoders 354*a*–354*c* are provided to a circuit 357 for selecting the output from the decoders 354*a*–354*c* which exhibits the best correlation between the signal which is received by the decoder and the particular PN code sequence and rate for which it is designed. As will be appreciated by those having ordinary skill in the art, the decoder which receives the PN coded spread spectrum signal having a data transmission rate corresponding to the that for which the decoder is designed, will exhibit the best correlation at its output. The circuit 357 can be a logic array and/or a switch or multiplexer which automatically couples the output of the decoder 354*a*–354*c* exhibiting the best correlation onto line 358. In addition, the circuit 357 is designed to provide an output to the microcontroller 350 via line 359 indicating the PN code length and the chipping rate of the received signal by virtue of knowing which decoder 354*a*–354*c* produced the best correlation. In other words, if the decoder 354*a* provides the best correlation, it is known that the data transmission rate of the received signal is fast. If the decoder 354*b* provides the best correlation, it is known that the data transmission rate is mid. Finally, if the decoder 354*c* provides the best correlation, it is known that the data transmission rate is slow.

The output on line 358 from the circuit 357 is connected to the pole of switch 361. The microcontroller 350 controls the position of the switch 361 so as to determine whether the decoded spread spectrum signal on line 358 is input to a BPSK demodulator 362*a* or a QPSK demodulator 362*b*. Thus, if the signal received from the mobile terminal is at the mid or slow data rate as determined by the circuit 357 initially at least, the microcontroller 350 causes the switch to couple the signal on line 358 to the input of the BPSK demodulator 362*a*. On the other hand, if the signal received from the mobile terminal is at the fast rate, the microcontroller 350 causes the switch 361 to couple the signal on line 358 to the input of the QPSK demodulator 362*b*. The BPSK and QPSK demodulators 362*a* and 362*b*, respectively, are conventional in design. The output of each demodulator 362*a*, 362*b* is connected to a RECEIVE DATA line which provides the demodulated data to the data input of the microcontroller 350.

It will be appreciated that in the present embodiment, decoders 354*a* and 354*b* for the fast and mid data rates are each configured for processing a PN code having a code length of 11 and a chipping rate of 11 MHZ. Hence, whether the data received by the base station 210 has been transmitted at the fast rate or the mid rate, the outputs of both decoders 354*a* and 354*b* should show good correlation. Consequently, the decoders 354*a* and 354*b* can either be combined into a common unit or the circuit 357 can be designed to select one of the two by default in the event both show good correlation. In either case, however, the information provided to the microcontroller 350 from the circuit 357 via line 359 distinguishes only whether the data transmission is at the slow rate or is at a mid/fast rate. The circuit 357 cannot distinguish between the mid and fast rates based only on the outputs of the decoders 354*a* and 354*b*. As a result, the "normal" or default position of the switch 361 is in the position whereby the signal on line 358 is coupled to the input of the BPSK demodulator 362*a*. According to the exemplary embodiment as described herein, the mobile terminals are configured to initially transmit the header portion 302 of the packet at the mid or slow data transmission rate. Consequently, the data will be correctly demodulated. Thereafter, information contained in the data packet received from the mobile terminal will provide the microcontroller 350 with information as to the appropriate data transmission rate.

The transmitter system of the base station 210 is functionally equivalent to the transmitter system of the mobile terminal 230 described above. In other words, data to be transmitted is output from the microcontroller 350 onto the TRANSMIT DATA line. The data on the TRANSMIT DATA line is selectively connected via switch 365 to either the input of BPSK modulator 366a or the input of QPSK modulator 366b. In the event data is to be transmitted at the fast rate, the microcontroller 350 causes the switch 365 to couple the data to be transmitted to the QPSK modulator 366b. If data is to be transmitted at the mid or slow rates, the microcontroller 350 causes the switch 365 to couple the data on the TRANSMIT DATA line to the BPSK modulator 366a.

Like the mobile terminal 230, the base station 210 includes a programmable PN encoder 320 which is identical in construction and operation. Consequently, the details thereof will not be repeated for sake of brevity. It suffices to say that when the base station 210 elects to transmit data at the fast or rate, the microcontroller 350 provides to the programmable PN code sequencer 321 a PN code select signal identifying the PN code with a code length of 11. In addition, the microcontroller 350 provides a chip rate select signal via the timing controller 324 to the programmable PN code sequencer 321, the chip rate select signal being representative of a chipping rate of 11 MHZ. When the base station is to transmit data at the slow rate, the microcontroller 350 provides the same chip rate select signal representative of 11 MHZ; however, the PN code select signal provided by the microcontroller 350 has a code length of 22 rather than 11. The programmable PN code sequencer 321, in turn, generates a PN code sequence with the appropriate PN code and chipping rate which is then mixed via the mixer 322 with the modulated outputs from the BPSK and QPSK modulators 366a, 366b.

The resultant PN spread spectrum signal is then output on line 329 so as to be an input to the RF up-conversion circuit 368. Like the RF up-conversion circuit 326 in the mobile terminal, the circuit 368 is conventional in design and mixes the PN spread spectrum signal onto an RF carrier. The output of the RF up-conversion circuit 326 is provided to the input of an adjustable gain RF output amplifier 369. The output of the amplifier 326 is coupled to the transmit terminal of the receive/transmit switch 352 such that the spread spectrum RF signal can be transmitted via one of the antennas 290 or 292.

The gain of the RF output amplifier 369 is controlled by the microcontroller 350 so as to increase or decrease the transmit power level of the base station 210. For example, the base station 210 includes a signal level detector circuit 370. The signal level detector circuit 370 detects the level of the signal received via the output of the receive/transmit switch 352 for example. If the signal level is below a predetermined threshold, for example, indicating that the mobile terminal is far away, the signal level detector circuit 370 sends a "low power" control signal to the microcontroller 350. The microcontroller 350 may in turn increase the gain of the amplifier 369. In addition, or in the alternative, the microcontroller 350 may switch from the antenna 290 to the higher gain antenna 292 via the switch 351. If the signal level detected by the signal level detector circuit 370 is above another predetermined threshold, thereby indicating that the mobile terminal is close, the signal level detector circuit 370 provides a "high power" control signal to the microcontroller 350. In response, the microcontroller 350 can reduce the gain of the RF output amplifier 369 so as to avoid the possibility of saturating the front end of the mobile terminal. In addition, or in the alternative, the microcontroller 350 may cause the base station 210 to switch from a higher gain antenna to a lower gain antenna via the switch 351.

The base station 210 also includes a memory 370 serving as system memory for the microcontroller 350 and which is substantially identical in function to the memory 330 described above in connection with the mobile terminal. In addition, the base station may include a user interface 372 such as a keypad, display, etc.

Also included in the base station 210 is a power supply 374 for providing the necessary power for operating the device. In the conventional case, the power supply can be based on power received from conventional power lines (not shown). However, it will be appreciated that all or part of the features shown in FIG. 3C also apply to the above discussed wireless base stations 215. Hence the power supply 374 can also be a solar powered, rechargeable battery based system as is discussed below in more detail in relation to FIG. 6B. Furthermore, in another embodiment of the invention, the base station includes an error correction circuit as part of the receiver system as represented by phantom box 378. Particularly in the case where the base station is a wireless base station 215, it is desirable to include an error correction circuit 378 for reducing errors in the received data. The circuit 378 can be of conventional design, but it is preferably included in wireless base stations 215 which are used as repeater stations. As is discussed more fully below, it is significant that wireless base stations 215 which serve as repeaters include such an error correction circuit 378. In this manner, the total number of errors which occur during multiple hops can be decreased.

Although the above embodiments of the mobile terminal 230 and the base stations 210, 215 where described as using the same chipping rate regardless of whether the data is being transmitted at a fast, mid or slow rate, it will be appreciated that another embodiment may involve adjusting the chipping rates via the appropriate timing controller. Similarly, although the above embodiments are designed primarily using discrete hardware components, it will be appreciated that the majority of functions can be carried out primarily via software without departing from the scope of the invention. Also, although the receiver system in both the mobile terminal 230 and the base station 210, 215 was described as a bank of decoders operating in parallel, it will be appreciated that another embodiment of the invention may use a serial type receiver which adjusts the timing of the PN signal provided to the mixer until a valid signal is found.

Furthermore, the exemplary embodiment utilized BPSK and QPSK modulation techniques. Nevertheless, other modulation techniques can be substituted or added as conditions dictate. For example, a QAM modulation scheme may be utilized in addition to BPSK and QPSK. Hence, the present invention is not intended to be limited to any particular combination necessarily. FIGS. 7A–7E and 8A–8E discussed below illustrate additional embodiments of the present invention.

The above discussion of FIGS. 3B and 3C describes in detail exemplary hardware configurations of the mobile terminals 230 and base stations 210, 215. The following description explains in more detail the relevant protocols involved.

Figure 4A:
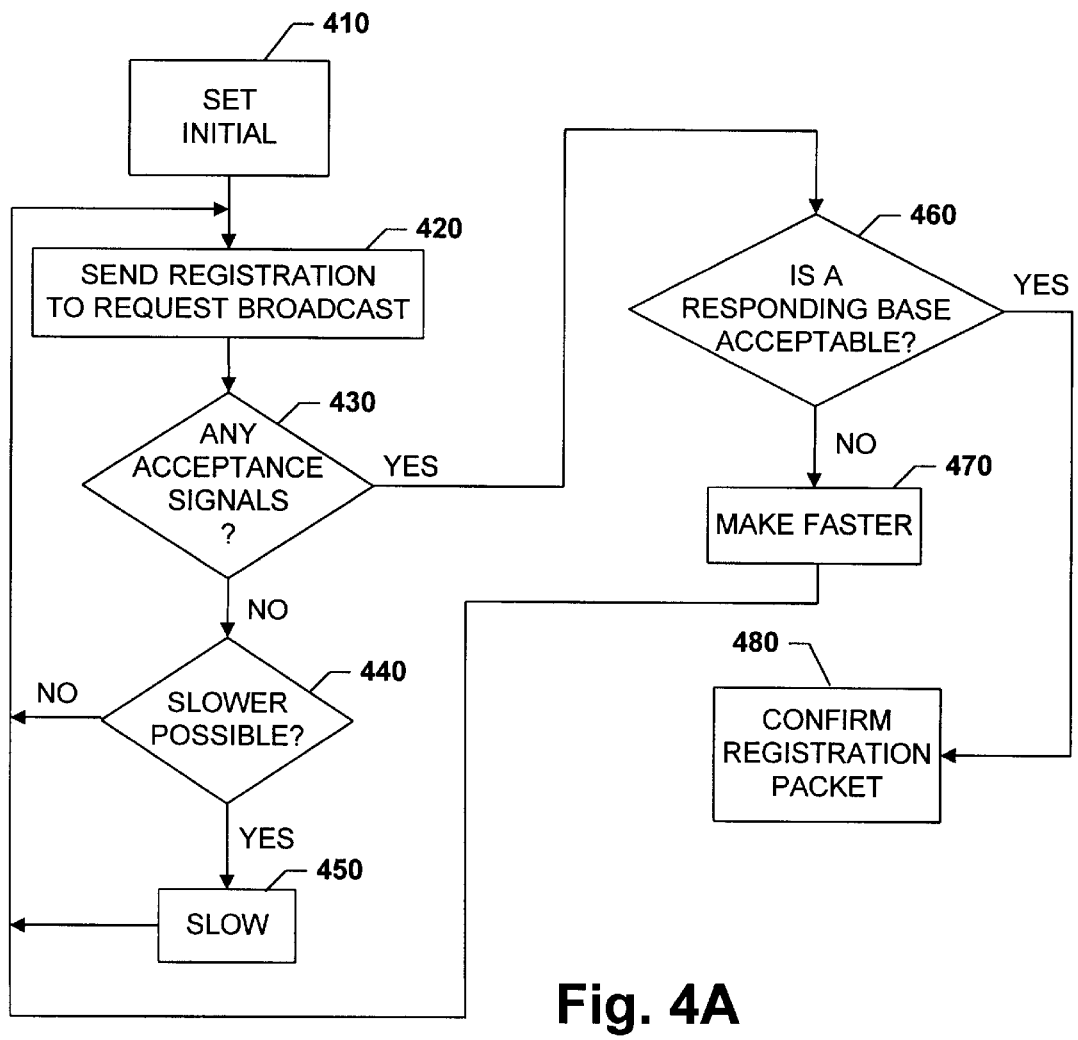
FIG. 4A is a flowchart illustrating a mobile terminal registering with and ascertaining a data communications rate for communicating with a base station.
Figure 4B:
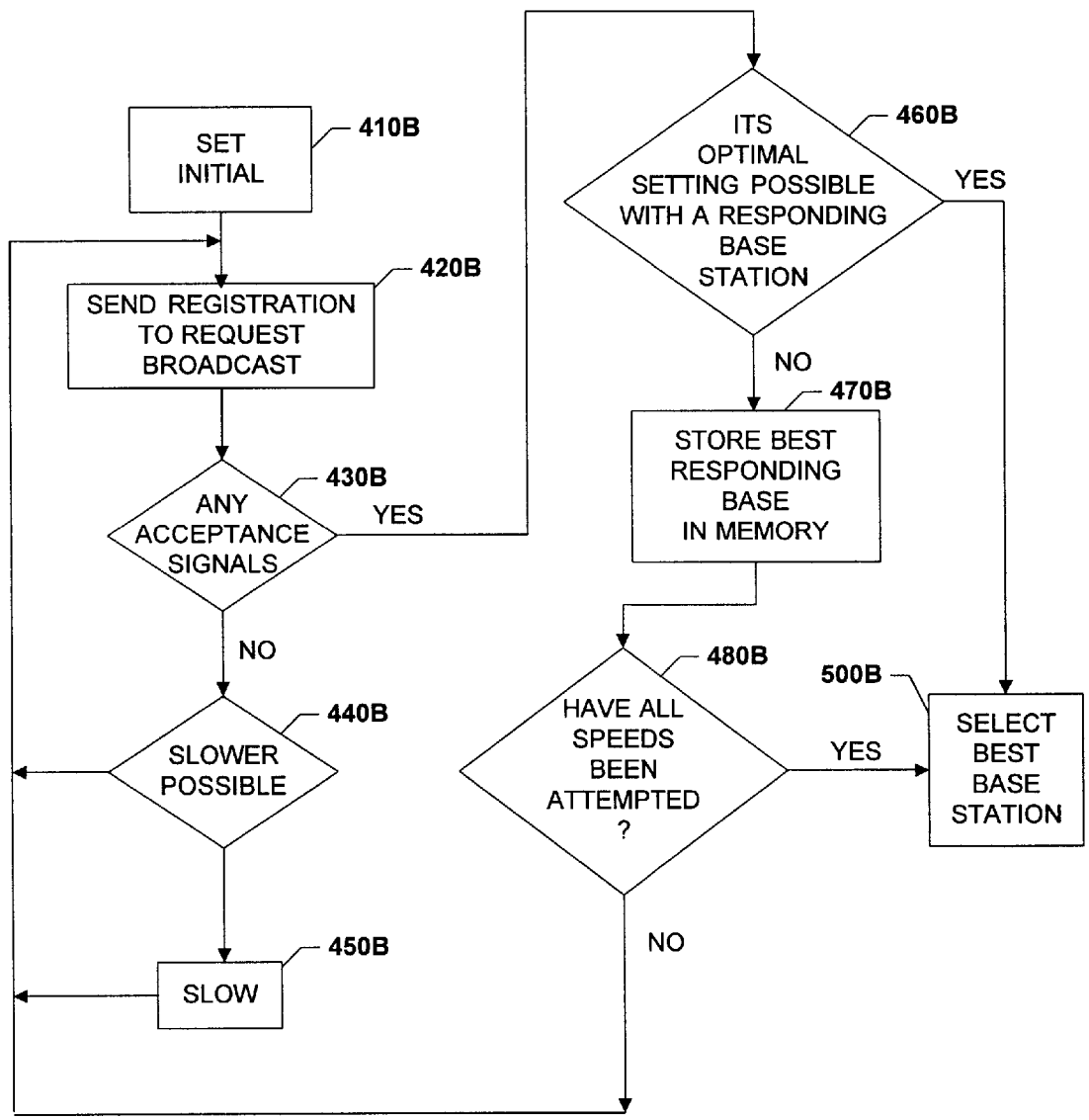
FIG. 4B is the process as described in FIG. 4, wherein at least one of the base stations that the mobile terminal is attempting to register with is a wireless base station.

FIG. 4A is a flowchart that represents the process by which a mobile terminal 230 registers with a base station 210 hardwired to the backbone and selects an initial data rate to be used for communicating with the base station. The FIG. 4A flow chart is based on situations where all responding base stations 210 are hardwired to the backbone 260 while FIG. 4B shows the steps taken when one or more responding base stations are wireless. At step 410 in FIG. 4A, the mobile terminal 230 sets its initial rate at which it will attempt to register with one of the base stations. The initial rate set may simply default to a fast rate or be set in accordance with the rate at which previous communications have occurred or be set by any other criteria including a transmission rate known to be within the capability of certain base stations. At step 420, the mobile terminal 230 broadcasts a request to register a packet known as the "find router" packet to any base station 210, 211, 215 available to receive the broadcast. The "find router" packet includes information indicating to any base stations 210, 211, 215 within receiving range of the broadcast that the particular mobile terminal 230 is seeking to register with a base station. The base stations which receive the packet, in turn, are programmed to transmit a "router identification" packet to any mobile terminals 230 from which they receive a "find router" packet. These "router identification" packets include information as to the identity of the base station, the amount of use (or "load") on the base station, and an indication of the relative location of the base station in the system 200. The information related to the location of the base station indicates to the mobile terminal how many "hops" the responding base station is from the system backbone 260. Base stations hardwired to the network are considered a single "hop" for the mobile terminal, whereas each additional wireless base station 215 used to access the network adds a "hop" through which the mobile terminal must communicate in order to access the backbone 260.

At step 430, the mobile terminal 230 waits for a preset period of time and determines whether a "router identification" signal has been received from at least one base station 210, 211, 215. If no "router identification" is received, then the mobile terminal 230 proceeds to step 440. At step 440, it is determined whether the particular embodiment of the mobile terminal 230 in use has the capability of communication at a slower rate. If it is possible, then at step 450 data transmission rate parameters within the mobile terminal 230 are changed to slow the data transmission rate, thereby increasing the signal range, and proceeds back to step 420 and attempts to register with a base station 210 at the slower transmission rate. If it is not possible to slow the communication rate, then the mobile terminal proceeds back to step 420 where it retransmits its "find router."

If, at step 430, the mobile terminal 230 receives a "router identification" signal, then the terminal proceeds to step 460. At step 460, the mobile terminal 230 determines if the responding base station 210 is acceptable. When all the responding base stations 210 are hardwired to the backbone 260 (i.e. a completely single "hop" network), then there are two instances when the responding base station 210 would be acceptable: (1) when the request to register signal was sent at the fastest rate, or (2) when the request to register was not sent at the fastest rate, however, there was no acceptance at an already attempted faster rate. If the mobile terminal 230 receives more then one acceptable "router identification" packet in step 460 then the mobile terminal 230 is programmed to evaluate the packets according to predetermine criteria in order to select a base station 210 with which to register. Such predetermined criteria may be based on, for example, which base station 210 exhibits the lowest load. The mobile terminal 230 will then proceed to step 480 where it will register with the base station 210 selected.

If the responding base station 210 is not acceptable, then the mobile terminal 230 will proceed to step 470 where the mobile terminal parameters are modified to send the "request to register" at a faster rate and then proceeds back to step 420 where it attempts to register at the faster rate. The purpose of the step 420 is to help optimize the system by ensuring that the base station with the strongest signal is being used.

In a multiple "hop" cellular communication system 200 having one or more wireless base stations responding to a mobile terminal's 230 "find router" packet, determining whether a given base station 210 is acceptable is slightly more complex. FIG. 4B depicts the steps taken by a mobile terminal when at least one wireless base station 215 responds to the mobile terminal's "find router" packet. As shown in FIG. 4B, steps 410B through 450B remain unchanged from corresponding steps 410 through 450 in the process described above dealing with the situation where all responding base stations are hardwired to the network. However, in this situation determining whether to register with a given base station, it is not enough that the mobile terminal is communicating at the fastest possible rate with any base station. What must be determined is at what speed the mobile terminal 230 must transmit information in order to register with a base station 210, 215 which will provide the fastest "overall" transmission time to the network. When wireless base stations 215 are involved, the overall time it takes a mobile terminal 230 to access the network will include the time it takes to send a packet from the mobile terminal 230 to the wireless base station 215, processing (or queuing) time for the wireless base station 215, and the time it takes the wireless base station to send the packet to the network. For instance, if a mobile terminal 230 is communicating with a wireless base station 215 at the fastest possible rate, a further inquiry must be made to determine what speed the wireless base station 215 is communicating with the network. If the wireless base station 215 is communicating at a slow speed with the network, it may be more optimal for the mobile terminal 230 to reduce its own communicating parameters and attempt to directly communicate with a base station 210 hardwired to the network. If this is done, the time it takes to send the information to the wireless base station 215 plus the processing time needed by the wireless base station is eliminated.

In order to account for these extra parameters associated with wireless base stations 215, lookup tables may be maintained within the memory of each mobile terminal 230. The lookup tables are set up to allow the mobile terminals 230 the ability to determine the overall time it would take to send information to the network via a given route. An example lookup table may be as follows:

Assume time for High speed=x, Medium speed=2x, slow speed=4x, and queuing time=0.1x

|  | Wireless base station to network = High | Wireless base station to network = Medium | Wireless base station to network = Slow |
| --- | --- | --- | --- |
| Mobile to wireless base station = High | Time equals: $x + x + .1x = 2.1x$ | Time equals: $x + 2x + .1x = 3.1x$ | Time equals: $x + 4x + .1x = 5.1x$ |
| Mobile to wireless base station = Med. | Time equals: $2x + x + .1x = 3.1x$ | Time equals: $2x + 2x + .1x = 4.1x$ | Time equals: $2x + 4x + .1x = 6.1x$ |
| Mobile to wireless base station = Slow | Time equals: $4x + x + .1x = 5.1x$ | Time equals: $4x + 2x + .1x = 6.1x$ | Time equals: $4x + 4x + .1x = 8.1x$ |

The values from this lookup table can be compared with the amount of time it would take if the mobile terminal 230 communicated directly with a hardwired base station 210, or the lookup table could be used to compare the total time it would take to communicate via two different wireless base station paths. In the preferred embodiment, the processor of the mobile terminal 230 would be programmed to optimize communication time given these calculations. As shown in FIG. 4B, in achieving these optimal settings, the mobile terminal at step 460B would initially determine if registering with one of the currently responding base stations would necessarily allow for an optimal setting. Such may be the case if the mobile terminal is transmitting at the fastest rate to a base station hardwired to the backbone. If the optimal setting is possible, then at step 500B registration is confirmed with this base station. If more then one responding base station would provide optimal settings, then one base station would be selected based on the mobile terminals predetermined criteria as discussed above.

If at step 460B, it is not possible to definitively select an optimal responding base station, then at step 470B the responding base station providing the best time is stored in memory. At step 480B, if the mobile terminal has sent out registration requests at all three speeds then the mobile terminal compares the best responding base station times from each of the three registration broadcasts. Following this comparison, the mobile terminal goes to step 500B where it selects the most optimal base station. If at step 480B, the mobile terminal has not sent out registrations at all three speeds then the transmission speed of the mobile terminal is adjusted to transmit at a faster rate if possible, or else at the slowest rate and the mobile terminal proceeds back to step 420. In this manner, the fastest path to the network is established by reviewing the overall transmission time to the network at different rates.

Each wireless base station 210 transmits registration information to base stations with which it formed a permanent link, as is discussed above.

Registration update packets are sent out periodically by each wireless base station to each base station 210 forming a link to the system backbone 260. Upon receiving the registration update packet, each base station adds the mobile terminals indicated in the update packet into their own registration table. In this manner, base stations hardwired to the network will know which packets to copy off of the system backbone 260 and transmit to the mobile terminal via the permanent link formed with the wireless base station(s).

Whenever information packets are wirelessly transmitted, there is a real possibility of errors occurring within the packet. In situations where wireless base stations are used as intermediate links between the network and a mobile terminal, the possibility of errors occurring significantly increases since the information is being wirelessly transmitted and received multiple times depending on the number of wireless base stations involved. Therefore, under the present invention, each wireless base station has an error correction circuit 378 (FIG. 3C) which is used to correct errors in the information packet received prior to retransmitting the packet. In this manner, stacked errors which occur from the repeated wireless transmission of data is better avoided.

Figure 5:
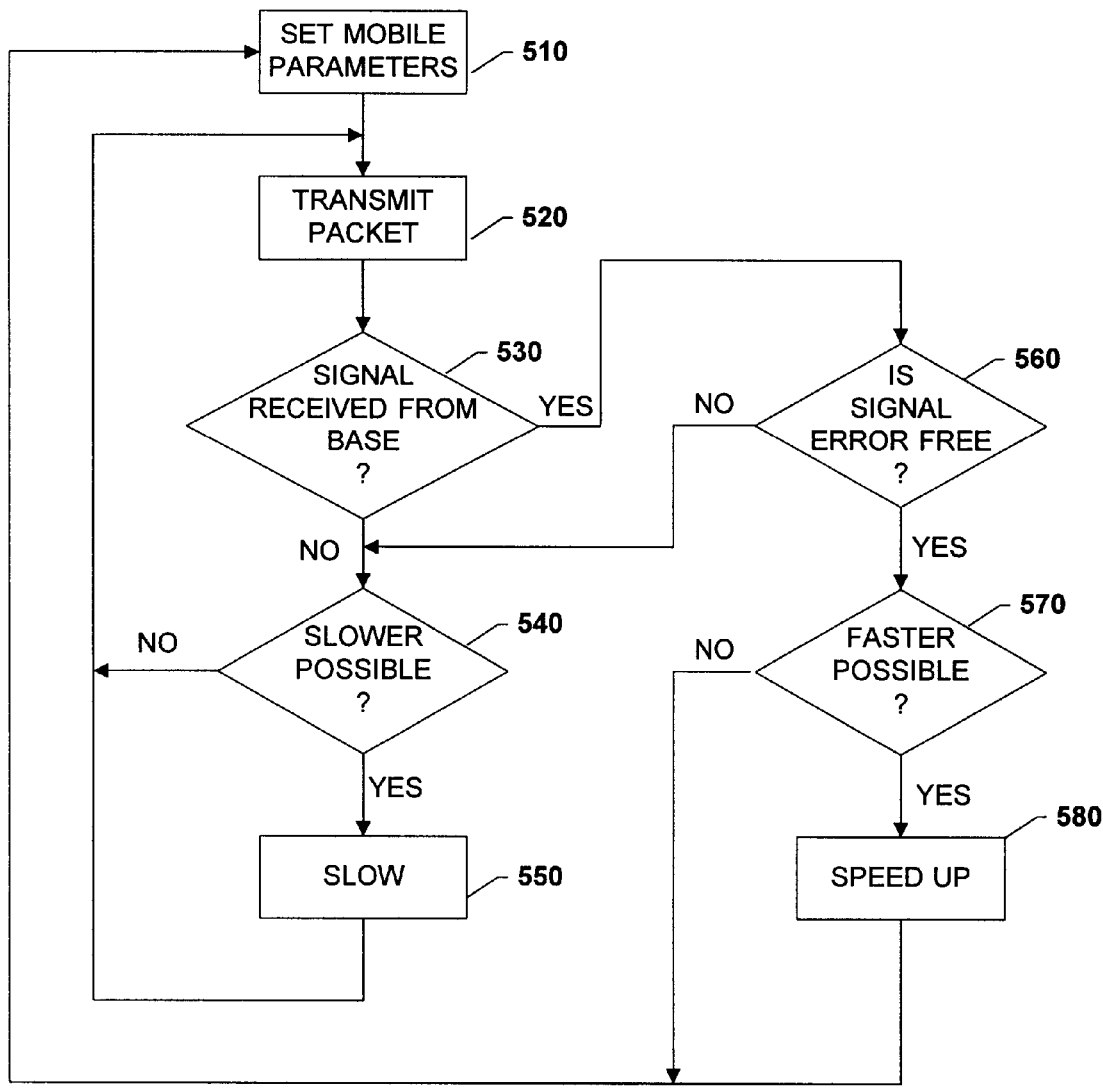
FIG. 5 is a system flowchart illustrating a mobile terminal setting communication parameters to correspond to a selected data communications rate with a base station.

Once the mobile terminal 230 is registered and an initial data rate is set, all communication between the base stations 210, 215 and the mobile terminal 230 may take place at that data rate. Periodically, the mobile terminal 230 may attempt to re-register at a faster data rate. Alternatively, the mobile terminal may vary the communication rate while already registered. FIG. 5 is a flowchart which represents this process. Step 510 represents the mobile terminal setting the communication parameters to correspond to the data rate at which it will attempt communication with the base station 210, 215. The initial setting may be a default rate, a rate previously used, a rate at which the mobile terminal 230 has recently intercepted a transmission from the base station, or a rate set by some other criteria. At step 520, the mobile terminal 230 transmits a "find router" packet at the rate set. At step 530, the mobile terminal 230 then waits to receive a "router identification" response signal from the base station 210. The base station 210 will send the response signal at the same data rate or rates used by the mobile terminal 230. If no response signal is received by the mobile terminal 230, it can be concluded that the base station 210, 215 did not receive the transmission, or the transmission was not received error free. Therefore the mobile terminal 230 attempts to increase the range and accuracy by using a slower data rate. Step 540 represents the mobile terminal determining whether a slower rate is possible. If the determination results in a positive answer, the mobile terminal 230 varies communication parameters to slow the rate at step 550 and retransmits at step 520. If a slower rate is not possible, the mobile terminal 230 simply returns to step 520 to attempt another transmission. To avoid an endless loop at the slowest data rate, the mobile terminal 230 may attempt to register with another base station (as discussed earlier) when communication is no longer possible with the present base station 210 or 215.

If, at step 530, a response signal is received within a preset period of time, then the mobile terminal 230 proceeds to step 560. At step 560, the mobile terminal 230 determines whether the response signal was received error free. If not, then the mobile terminal progresses to step 540 where it determines if a slower data rate is possible. However, if the response signal is received error free, then the mobile terminal proceeds to step 570 where it determines whether a faster communication rate with the base station 210 or 215 is possible. If it is possible, then at step 580 one or more communication parameters within the mobile terminal 230 are changed to increase the communication rate with the base station. The new parameters are set at step 510 for use when transmitting the next packet. If, however, at step 570, it is not possible to increase the communication rate between the mobile terminal and the base station, then the mobile terminal will simply keep the currently set communication parameters at step 510.

Figure 6A:
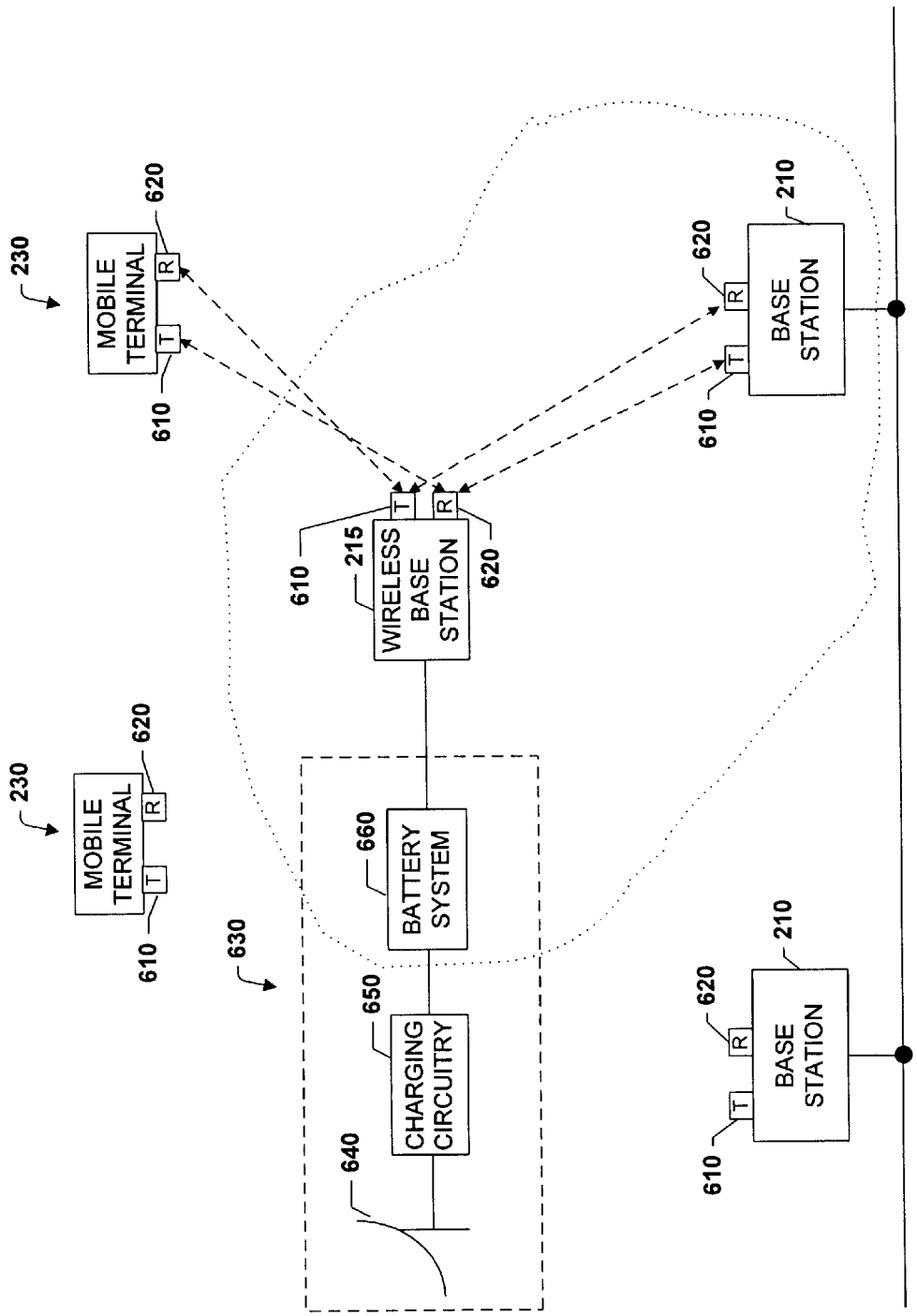
FIG. 6A is a schematic representation of a portion of a cellular communication system of the present invention.

As an illustrative example of a cellular communication system in accordance with this invention, FIG. 6A shows a mobile terminal 230 communicating with a device on the system backbone 260. The mobile terminal is registered to a wireless base station 215 which has formed a permanent link to the system backbone through base station 210. Both the wireless base station 215 and the hardwired base station 210 have the ability to dynamically alter parameters such as modulation complexity, PN code length, and/or chipping rate in order to optimize data transmission as discussed above. The wireless base station 215 increases the geographic area in which the mobile terminal 230 can travel and still maintain contact with devices on the system backbone 260. In order to further increase the distance from which the wireless base station 215 can communicate with the base station 210, an omnidirectional type antenna is directed toward the base station 210. In other embodiments, the two antennas could be attached to the wireless base station, wherein one antenna is a yagi type directed antenna for communicating with the hardwired base station, and a second antenna is a omnidirectional type antenna for receiving and transmitting to the mobile terminal 230. Although only one wireless base station 210 is shown to act as an intermediate link between the mobile terminal 230 and the base station 210, it should be appreciated that several wireless base stations 210 could be used in a row to further extend communicating range.

As described above in the background section, oftentimes there are problems associated with running power lines from the system backbone 260 to the wireless base station 215. To avoid these problems, this invention utilizes a solar powering system 630 to provide power to the wireless base station 215. In other embodiments, wind, water or other natural energy resources could be used. Referring to FIG. 6A, the solar powering system 630 includes solar panels 640, charging circuitry 650, and a battery system 660. The charging circuitry 650 is coupled to the solar panels 640 and the battery system 660 and serves to regulate the amount of power fed into the battery system 660 at any given time. The battery system 660 is coupled to the wireless base station 215 and provides power independent of any power supplied through the system backbone 260. It should be appreciated that in another embodiment the wireless base station 215 may connect directly to the charging circuitry 650 or the solar panel 640 itself.

Figure 6B:
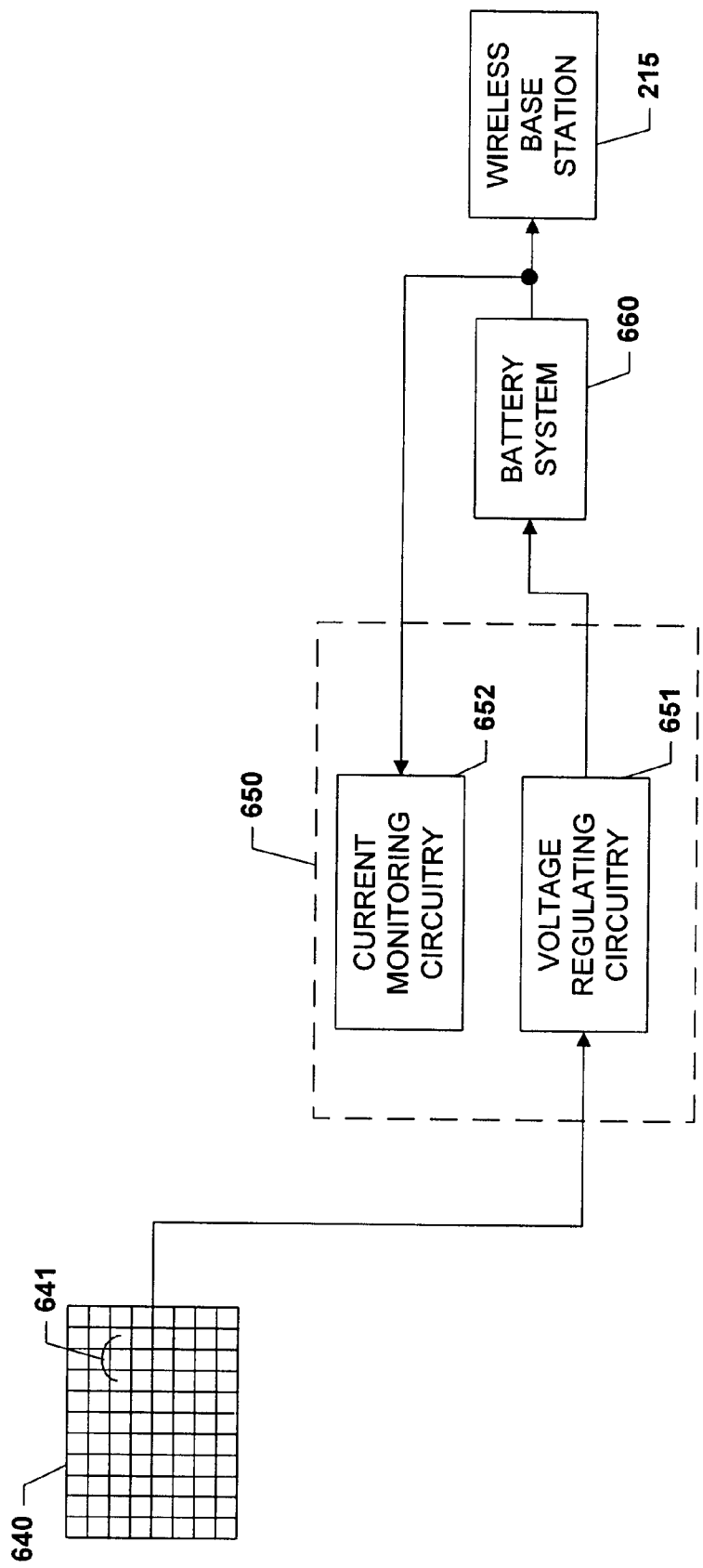
FIG. 6B is a block diagram of a solar powered wireless base station in accordance with the present invention.

In this particular embodiment, a photovoltaic solar panel 640 having a number of cells 641 is used as shown in FIG. 6B. The cells 641 are textured and have an anti-reflection coating in order to better absorb energy from the sun. The overall size of the solar panel 640 is approximately five square feet. The solar panel 640 should be of a type which can sufficiently recharge the battery system 660 within a reasonable amount of time determined by the estimated amount of sun light expected in a given area. For example, in particularly sunny areas such as a desert it may be sufficient to have smaller or fewer solar panels 640 which recharge the battery system 660 at a slower rate since it is expected that the sun's energy can be captured by solar panels 640 during a large part of the day. By contrast, in areas where it may be cloudy during a greater portion of the day, larger solar panels 640 capable of recharging the battery system 660 in a shorter period of time may be necessary in order to ensure the solar powering system 630 remains reliable throughout various weather conditions. In many typical climates having semi-unpredictable weather conditions, a solar panel 640 such as the model M55 produced by Siemens of Camarillo, Calif. may be used. It is estimated that this particular solar panel is capable of fully recharging the battery system 660, described in more below, after receiving approximately twenty four hours of full sun light. It should be appreciated, however, that full sun light is not necessary to recharge the battery system as the solar panels can still capture solar energy at a slower rates when conditions do not allow for full sun light to be received.

The purpose of the battery system 660 is to store energy captured by the solar panels 640 for later use. In this particular embodiment, two 12-volt lead acid gel cell batteries connected in series are used to form the battery system 660. Each battery is rated to provide 90 amp-hours of power. At this rate, it is estimated that at full charge the battery system containing these two batteries could supply approximately nine days of continuous power to the wireless base station 215 without any recharging. A variety other batteries capable of supplying varying amounts of power could readily be used.

The charging circuitry 650 regulates the amount of energy fed into the battery system 660 and monitors the power level of the battery system 660. In order to perform these functions, the charging circuitry 650 includes voltage regulating circuitry 651 and current monitoring circuitry 652. The voltage regulating circuitry 651 connects the solar panels to the battery system 660 and provides constant voltage to the battery system 660 during recharging. The monitoring circuitry 652 regulates when recharging is to occur and is therefore connected to the voltage regulating circuitry 651. The monitoring circuitry is further connected to the output of the battery system 660 in order to monitor the amount of power being drained by the wireless base station 215. The monitoring circuitry 652 is set to allow solar based energy to enter the battery system 660 for recharging when the monitoring circuitry 650 senses the battery system 660 has dropped below a charge resumption set point. In this particular embodiment, the charge resumption set point is set at 18 volts which represents a lower end voltage level at which the wireless base station can still operate properly. Charging circuitry 650 such as the Automatic Sequencing Charger (ASC) produced by Specialty Concepts, Inc of Canoga Park, Calif. could be used in this invention.

The amount of power consumed by a typical wireless base station 215 will greatly vary by the amount of activity being processed. It is estimated that the amount of power needed to run an wireless base station in its idle state is 0.25 amps at 0.22 volts. During an active state, such as when the wireless base station is transmitting or receiving information, approximately 0.5 amps is needed at the same voltage level. In any event, by utilizing the solar powering system 630, the power requirements for the wireless base station 215 of this exemplary embodiment will be met.

Generally, as described above, the transmitter system 610 and the receiver system 620 of the base stations 210, wireless base station 215 and mobile terminal 230 will adjust their parameters in order to optimize the system 200. Thus, the following sections describe in detail a variety of embodiments which the transmitter system 610 and receiver system 620 may use in adjusting these data rates.

FIGS. 3B and 3C, discussed above, illustrate only one example of embodiments of a mobile terminal 230 and a base station 210, 215 in accordance with the invention. There are, in fact, a variety of ways in which similar flexibility in the data transmission characteristics can be obtained. The following is a discussion which generally describes different embodiments of a transmitter system and a receiver system for use in the mobile terminals and base stations.

The transmitter system, generally designated 610, of the present invention may be implemented in a number of embodiments. For example, referring to FIGS. 7A, 7B, and 7C, these embodiments may include two or more non-controllable transmitters 710*a*, a controllable transmitter 710*b*, and a combination of a non-controllable transmitter 710*a* and a controllable transmitter 710*a*. A non-controllable transmitter 710*a*, as shown in FIG. 7D for example and described in further detail below, is a transmitter which is typically used in conventional base stations 211 and conventional mobile terminals 231 because it is capable of transmitting PN coded signals formed with PN codes having only one preselected, non-adjustable value of each characteristic. On the other hand, a controllable transmitter 710*b*, as shown in FIG. 7E and described in more detail below, is a transmitter capable of transmitting PN coded signals formed with PN codes having a plurality of adjustable values for one or more modulation characteristics.

Figure 7A:
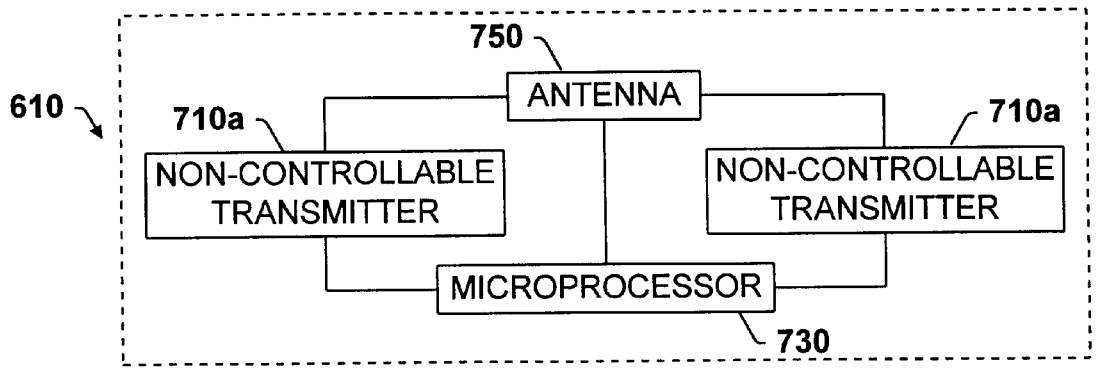
FIG. 7A is a block diagram of one embodiment of a transmitter system of the present invention.

FIG. 7A illustrates one of the embodiments of the transmitter system 610. For this embodiment, the transmitter system 610 includes a plurality of non-controllable transmitters 710*a*, a microprocessor 730 and an antenna 750. Each non-controllable transmitter 710*a* is capable of transmitting at a packet rate that is different than the values selected for each of the other non-controllable transmitters 710*a*. As is discussed above, the header portion 310 and the data portion 320 of the packet 300 may be sent at different data transmission rates and, therefore, each packet rate represents a different combination of these possibilities. Once a packet rate has been determined (via the processes described with reference to FIGS. 4 and 5), a microprocessor 730 will prepare for transmission by selecting the non-controllable transmitter 710a capable of transmitting at this rate.

Figure 7B:
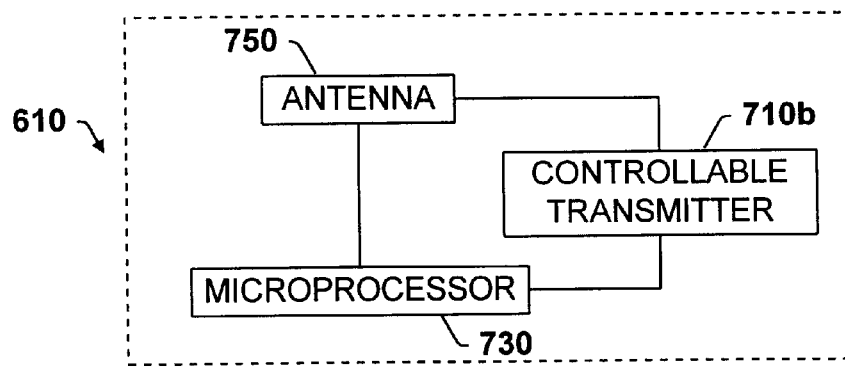
FIG. 7B is a block diagram of another embodiment of a transmitter system of the present invention.

FIG. 7B illustrates another embodiment of the transmitter system 610. This embodiment is very similar to the transmitter system 610 shown in FIG. 7A. However, this transmitter system 610 includes a controllable transmitter 710b, as opposed to a plurality of non-controllable transmitters 710a. Thus, in preparing for transmission, the microprocessor 730 will make adjustments to the controllable transmitter 710b such that it is capable of transmitting at the given packet rate.

Figure 7C:
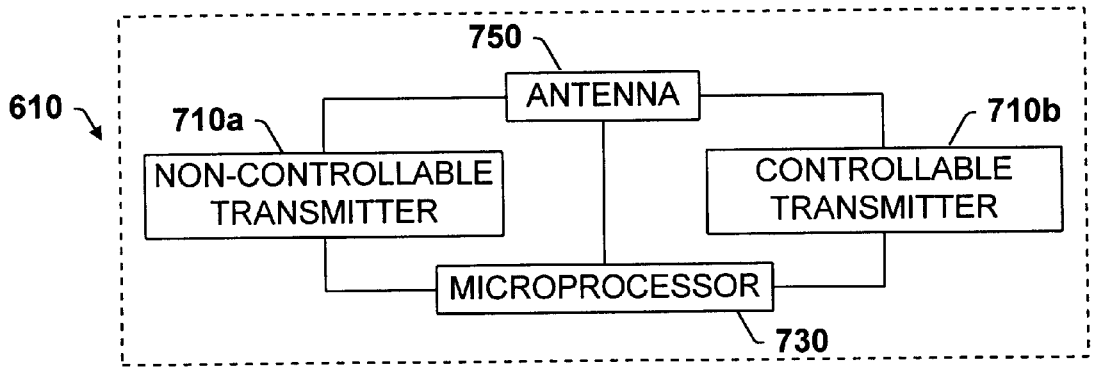
FIG. 7C is a block diagram of another embodiment of a transmitter system of the present invention.
Figure 7D:
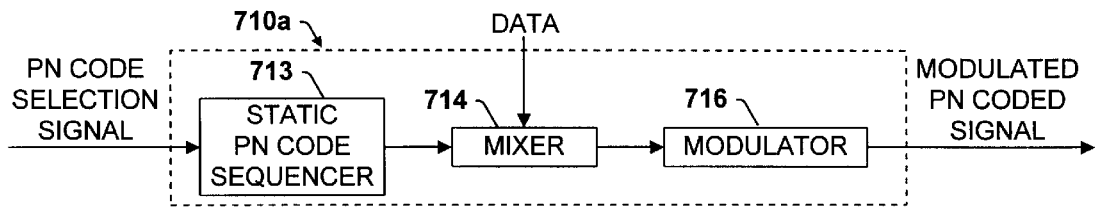
FIG. 7D is a block diagram of a non-controllable transmitter of the present invention.
Figure 7E:
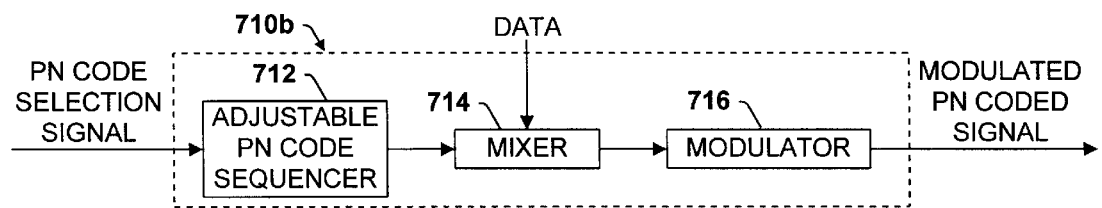
FIG. 7E is a block diagram of a controllable transmitter of the present invention.

FIG. 7C illustrates yet another embodiment of the transmitter system 610. This embodiment is also very similar to the transmitter systems 610 illustrated above in FIGS. 7A and 7B. However, this transmitter system 610 includes a non-controllable transmitter 710a and a controllable transmitter 710b. In preparing for transmission, the microprocessor 730 will first look to see if any non-controllable transmitter 710a is capable of sending at the given packet rate and, if so, the microprocessor 730 selects this transmitter. However, if no such non-controllable transmitter exists, then the microprocessor 730 will adjust the controllable transmitter 710b to send at the given packet rate.

Following the selection or adjustment of the proper transmitter in any of the embodiments shown above (7A, 7B, 7C), the microprocessor 730 may also adjust other communication parameters (i.e. antenna type, signal power, etc.) prior to transmission. Once all of these additional characteristics are adjusted for, the transmitter selected prepares to transmit according to the parameters set.

FIGS. 7D and 7E, are block diagrams of the non-controllable transmitter 710a and the controllable transmitter 710b. Referring to FIG. 7D, the non-controllable transmitter 710a generally includes a static PN code sequencer 713, a mixer 714 and a modulator 716. The mixer 714 receives the data to be transmitted and mixes the data with a PN code received from the static PN code sequencer 713, which is a PN code sequencer capable of sequencing a PN code having only constant parameters (i.e. chip code length, chipping rate . . . etc.). The mixer 714 then mixes the data with the PN code to form the PN coded signal and forwards the PN coded signal to the modulator 716. The modulator 716 then modulates the PN coded signal onto a carrier frequency with, for example, a BPSK or QPSK modulation complexity type.

Referring to FIG. 7E, the controllable transmitter 710b generally includes an adjustable PN code sequencer 712, a mixer 714 and a modulator 716. In operation, the adjustable PN code sequencer 712, which is a PN code sequencer capable of adjusting a PN code to a variety of parameters, receives a signal from the microprocessor 730 indicating the parameters to be set. This signal is then used to adjust the PN code values of the PN code sequencer 712 accordingly. The PN code sequencer 712 then forwards to the mixer 714 a PN code having the parameters selected. The mixer 714 receives data to be transmitted and mixes the data with the PN code received from the adjustable PN code sequencer 712. The mixer 714 then mixes the data with the PN code to form the PN coded signal and forwards the PN coded signal to the modulator 716. The modulator 716 then modulates the PN coded signal onto a carrier frequency with one of the modulation complexities.

Associated with each transmitter system 610 is a receiver system 620 using the same antenna 750 and microprocessor 730. However, unlike the transmitter systems, a receiver system is required to maintain certain characteristics when housed in a base station 210 which are not necessary for receiver systems housed in mobile terminals. The reason for the difference is that base station receivers, under this embodiment, are initially required to handle packets being sent at either the mid or slow packet rates (i.e. BPSK modulation and either an 11 or 22 chip PN code length, see above). Thus, in order to handle either instance, the base station receiver system must have at least two correlators to account for the different chip code lengths. A mobile terminal 230, on the other hand, initiates the communication with a base station 210 at a specific rate and any responding base station must reply at the same rate. Therefore, the mobile terminal receiver will not have to "guess" as to which rate the base station will respond and only needs one correlator to effectively communicate.

Similar to the transmitter system 610, the receiver system 620 of the present invention may also be implemented in a multitude of embodiments with the only restriction being that receiver systems for base stations must have at least two separate correlators, one of which is capable of handling a slow packet data transmission rate and one of which is capable of handling a mid packet data transmission rate. As described below, each receiver typically has only one correlator associated with it and, therefore, the receiver system 620 must have at least two receivers within it. However, since the initial packet is always sent at the BPSK rate (i.e. mid or slow rates) only one demodulator is needed to handle this initial data. If it is indicated that further data will be sent at the fast packet rate, then a second demodulator capable of handling a QPSK modulation complexity would be necessary.

Figure 8A:
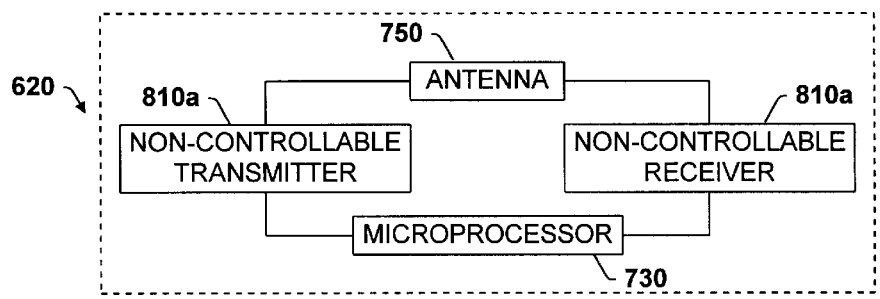
FIG. 8A is a block diagram of one embodiment of a receiver system of the present invention suitable for use within a base station or a mobile terminal.
Figure 8B:
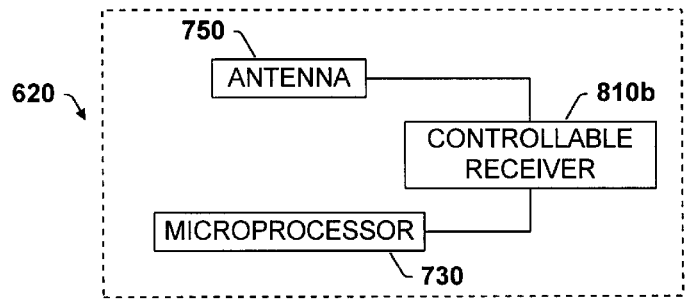
FIG. 8B is a block diagram of another embodiment of a receiver system of the present invention suitable for use within a base station or a mobile terminal.

FIGS. 8A and 8B show typical embodiments of the receiver system 620 of the present invention which may be used within a base station 210 or a mobile terminal 230. For instance, FIG. 8A shows the receiver system 620 with a combination of two or more non-controllable receivers 810a, while FIG. 8B shows the receiver system 620 having combination of a controllable receiver 810b and a non-controllable receiver 810a. As describe below, non-controllable receivers 810a are ones which do not have the capability of changing their own parameters to receive packets at data communication rates other then the rate preset within the particular non-controllable receiver. The controllable receivers 810b, on the other hand, have at least some capability to vary their receiving parameters to be able to receive packets at more then one data communication rate.

In operation, when only non-controllable receivers 810a are used in the receiver system 620 (see FIG. 8A), the microprocessor 730 will simply select the non-controllable receiver 810a capable of handling the packet to be received. If no such non-controllable receiver 810a exists, then the receiver system 620 would not be capable of receiving this packet. If, however, both a non-controllable receiver 810a and a controllable receiver 810b exist in the same receiver system 620 (see FIG. 8B), then the microprocessor 730 first determines whether the non-controllable receiver 810a is capable of handling the packet to be received. If so, the microprocessor 730 selects this non-controllable receiver 810a. If the non-controllable receiver 810a is not capable of handling the packet, then the microprocessor 730 will simply adjust the controllable receiver 810b such that it is capable of receiving the anticipated packet. Following this selection/adjustment process, the microprocessor 730 may also make adjustments to other parameters which may help the receiving process (i.e., changes to the antenna, battery power, etc.).

Figure 8C:
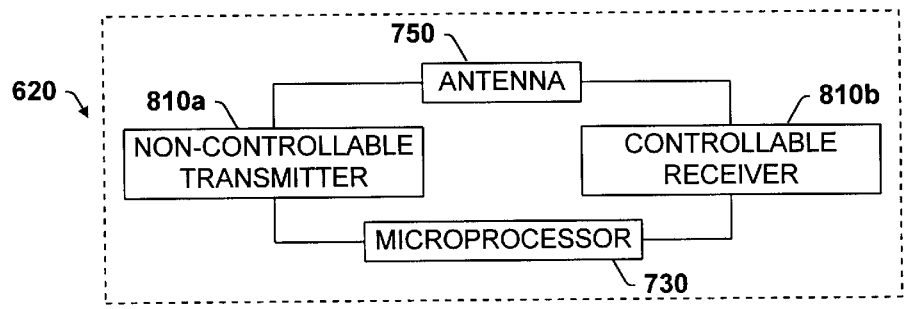
FIG. 8C is a block diagram of another embodiment of a receiver system of the present invention suitable for use within a mobile terminal with one controllable receiver.

As indicated above, since the mobile terminal 230 does not require two correlators, it is possible that only one receiver is used within the mobile terminal. Therefore, FIG. 8C depicts another embodiment which is available for the mobile terminal only. In this embodiment, the receiver system 620 utilizes only one controllable receiver 810b which is continually adjusted by the microprocessor 130 to receive packets at the desired rate.

Figure 8D:
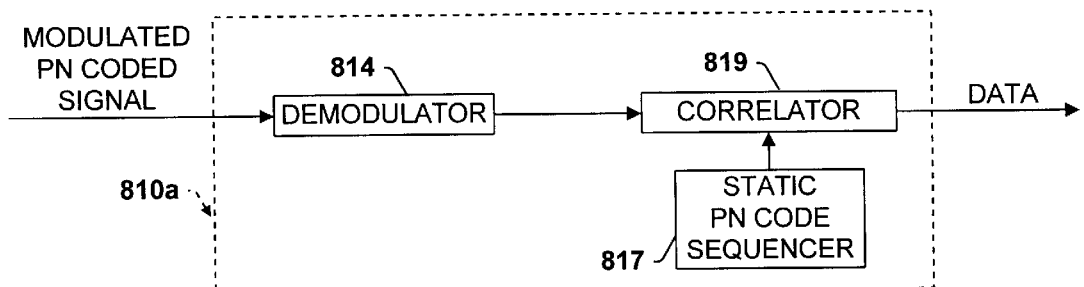
FIG. 8D is a block diagram of a non-controllable receiver of the present invention.
Figure 8E:
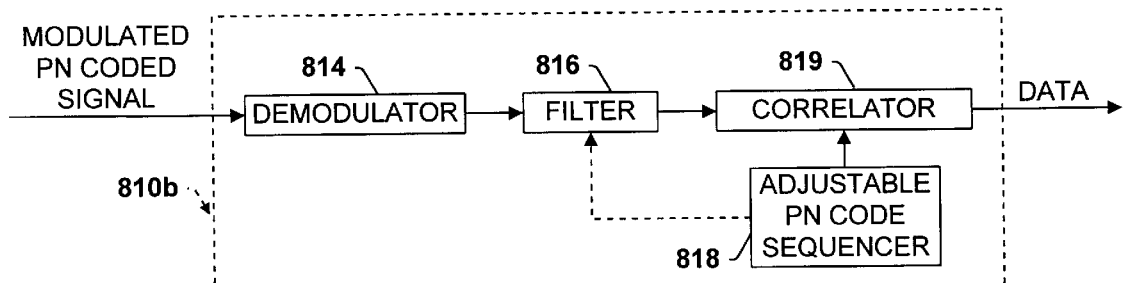
FIG. 8E is a block diagram of a controllable receiver of the present invention.

FIGS. 8D and 8E further describe the non-controllable receiver 810a and the controllable receiver 810b, respectively. Referring to FIG. 8D, the non-controllable receiver 810a generally includes a demodulator 814, a static PN code sequencer 817 and a correlator 819. In operation, the particular non-controllable receiver 810a has been selected by the microprocessor 730 because of its capability of receiving a packet having certain values which correspond to those values transmitted from a transmitter system 610.

The demodulator 814 receives the modulated PN coded signal from the transmitter system 610. The demodulator 814 demodulates the PN coded signal from the carrier frequency and forwards the PN coded signal to the correlator 819. The correlator 819 also receives a PN code received from the static PN code sequencer 817, which is a PN code sequencer capable of sequencing a PN code having only constant values. The correlator 819 then uses the PN code to correlate the data (extract or decode the data) from the PN coded signal.

Referring to FIG. 8E, as described above, the receiver system 620 may also include a controllable receiver 810b which may be used instead of or in conjunction with the non-controllable receivers 810a. The controllable receiver 810b is similar to the non-controllable receiver 810a but is additionally capable of receiving PN coded signals formed with PN codes having different values.

The controllable receiver 810b includes a demodulator 814, a filter (preferably a baseband filter) 816, an adjustable PN code sequencer 818 and a correlator 819. In operation, the demodulator 814 receives the modulated PN coded signal from the transmitter system 610. The demodulator 814 demodulates the PN coded signal from the carrier frequency and forwards the PN coded signal to the filter 816. Prior to receiving the PN coded signal, the filter 816 receives the PN code chipping rate value signal from the microprocessor 730 and adjusts its spectral bandwidth based on the PN code chipping rate value received. Upon receipt of the PN coded signal, the filter 816 then filters the PN coded signal and forwards the filtered PN coded signal to the correlator 819. Additionally, the adjustable PN code sequencer 818 may also be feed through the filter 816 prior to entering the correlator 819.

Prior to receiving the filtered PN coded signal, the correlator 819 receives a PN code length signal form the microprocessor 730 and adjusts itself accordingly to correlate a PN code having the PN chip code length value. In another embodiment, the correlator 819 is actually a plurality of correlators 819 and the microprocessor 730 selects the correlator 819 capable of correlating a PN code having the selected PN code length value.

Upon receipt of the PN coded signal, the correlator 819 also receives a PN code from the adjustable PN code sequencer 818, which is a PN code sequencer capable of adjusting a PN code to a variety of values received form the microprocessor 730. The correlator 819 then uses the PN code to correlate (decode) the data from the PN coded signal.

Another embodiment of the cellular communication system 200 of the present invention includes a mobile terminal 230 and/or base station 210 that can vary its transmitting parameters but not its receiving parameters. Conversely, such a system 200 may have a mobile terminal 230 and/or a base station 210 that can vary only its receiving parameters but not its transmitting parameters.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible.

What is claimed is:

1. A cellular communication system, comprising:

a plurality of base stations coupled to a system backbone, each of the base stations comprising a base station receiver system for receiving wireless communications and a base station transmitter system for transmitting wireless communications; and a plurality of mobile terminals each for communicating with the system backbone by way of at least one of the plurality of base stations, each of the plurality of mobile terminals having a mobile terminal transmitter for transmitting wireless communications to the at least one the plurality of base stations and a mobile terminal receiver system for receiving wireless communications from the at least one of the plurality of base stations;

wherein, with respect to at least one of the mobile terminals, at least one of the mobile terminal transmitter system and the mobile terminal receiving system wirelessly communicates with the at least one of the plurality of base stations by selectively transmitting or receiving data according to a plurality of different PN code parameters as a result of dynamically modifying the transmitting or receiving PN code parameters based on predetermined criteria relating to achieving an optimal communication rate.

2. The cellular communication system of claim 1, wherein the mobile terminal transmitting system of the at least one mobile terminal is controllable to select any of a plurality of different data transmission rates.

3. The cellular communication system of claim 2, wherein any of the plurality of different data transmission rates is selected by way of at least one of selecting among different PN code lengths and selecting among different chipping rates.

4. The cellular communication system of claim 1, wherein the mobile terminal transmitting system of the at least one mobile terminal is controllable based on communications received from the at least one of the plurality of base stations.

5. The cellular communication system of claim 4, wherein the controllable mobile terminal transmitting system is configured to transmit initially at a first data transmission rate and, based on communications received from the at least one of the plurality of base stations, to transmit subsequently at a second data transmission rate.

6. The cellular communication system of claim 1, wherein the mobile terminal receiving system of the at least one mobile terminal is controllable to select any of a plurality of different data transmission rates.

7. The cellular communication system of claim 6, wherein any of the plurality of different data transmission rates is selected by way of at least one of selecting among different PN code lengths and selecting among different chipping rates.

8. The cellular communication system of claim 1, wherein the base station transmitting system and the base station receiving system of the at least one of the plurality of base stations have generally fixed PN code parameters.

9. The cellular communication system of claim 1, wherein at least one of the base station transmitting system and the base station receiving system of the at least one of the plurality of base stations wirelessly communicates with the at least one mobile terminal by selectively transmitting or receiving data according to any of a plurality of different PN code parameters.

10. The cellular communication system of claim 9, wherein the base station transmitting system of the at least one base station is controllable to select any of a plurality of different data transmission rates.

11. The cellular communication system of claim 10, wherein any of the plurality of different data transmission rates is selected by way of at least one of selecting among different PN code lengths and selecting among different chipping rates.

12. The cellular communication system of claim 10, wherein the base station transmitting system is controllable based on communications received from the at least one of the plurality of mobile terminals.

13. The cellular communication system of claim 1, wherein at least one of the plurality of base stations is coupled to the system backbone by way of a wireless connection.

14. A cellular communication system, comprising:
a plurality of base stations coupled to a system backbone, each of the base stations comprising a base station receiver system for receiving wireless communications and a base station transmitter system for transmitting wireless communications; and
a plurality of mobile terminals each for communicating with the system backbone by way of at least one of the plurality of base stations, each of the plurality of mobile terminals having a mobile terminal transmitter for transmitting wireless communications to the at least one the plurality of base stations and a mobile terminal receiver system for receiving wireless communications from the at least one of the plurality of base stations;
wherein, with respect to at least one of the mobile terminals, at least one of the mobile terminal transmitter system and the mobile terminal receiving system wirelessly communicates with a first of the at least one of the plurality of base stations by selectively transmitting or receiving data according to a plurality of different transmission parameters.

15. The cellular communication system of claim 14, wherein the mobile terminal transmitting system of the at least one mobile terminal is controllable to select any of a plurality of different data transmission rates.

16. The cellular communication system of claim 15, wherein any of the plurality of different data transmission rates is selected by way of at least one of selecting among different PN code lengths, selecting among different chipping rates, and selecting among different modulation schemes.

17. The cellular communication system of claim 14, wherein the mobile terminal receiver system of the at least one mobile terminal is controllable to select any of a plurality of different data transmission rates.

18. The cellular communication system of claim 17, wherein any of the plurality of different data transmission rates is selected by way of at least one of selecting among different PN code lengths, selecting among different chipping rates, and selecting among different modulation schemes.

19. The cellular communication system of claim 14, wherein the plurality of different transmission parameters comprise different power levels at which data is transmitted.

20. The cellular communication system of claim 14, wherein the base station transmitting system and the base station receiving system of the at least one of the plurality of base stations have generally fixed transmission parameters.

21. The cellular communication system of claim 14, wherein at least one of the base station transmitting system and the base station receiving system of the at least one of the plurality of base stations wirelessly communicates with the at least one mobile terminal by selectively transmitting or receiving data according to any of a plurality of different transmission parameters.

22. The cellular communication system of claim 14, wherein the plurality of different transmission parameters comprise different power levels at which data is transmitted.

23. The cellular communication system of claim 10, wherein the plurality of different transmission parameters comprise different antennas used to receive or transmit data.

24. The cellular communication system of claim 14, wherein at least one of the plurality of base stations is coupled to the system backbone by way of a wireless connection.

25. A cellular communication system, comprising:
a plurality of base stations coupled to a system backbone, each of the base stations comprising a base station receiver system for receiving wireless communications and a base station transmitter system for transmitting wireless communications; and
a plurality of mobile terminals each for communicating with the system backbone by way of at least one of the plurality of base stations, each of the plurality of mobile terminals having a mobile terminal transmitter for transmitting wireless communications to the at least one the plurality of base stations and a mobile terminal receiver system for receiving wireless communications from the at least one of the plurality of base stations;
wherein, with respect to at least one of the mobile terminals, at least one of the mobile terminal transmitter system and the mobile terminal receiving system wirelessly communicates with the at least one of the plurality of base stations by selectively transmitting or receiving data according to a plurality of different PN code parameters as a result of dynamically modifying the transmitting or receiving PN code parameters based on predetermined criteria relating to achieving an optimal communication rate; and
wherein at least another one of the mobile terminals cannot vary any of its transmission parameters.

26. The cellular communication system of claim 25, wherein the mobile terminal transmitting system of the at least one mobile terminal is controllable to select any of a plurality of different data transmission rates.

27. The cellular communication system of claim 25, wherein the mobile terminal receiving system of the at least one mobile terminal is controllable to select any of a plurality of different data transmission rates.

28. A cellular communication system, comprising:
a plurality of base stations coupled to a system backbone, each of the base stations comprising a base station receiver system for receiving wireless communications and a base station transmitter system for transmitting wireless communications; and
a plurality of mobile terminals each for communicating with the system backbone by way of at least one of the plurality of base stations, each of the plurality of mobile terminals having a mobile terminal transmitter for transmitting wireless communications to the at least one the plurality of base stations and a mobile terminal receiver system for receiving wireless communications from the at least one of the plurality of base stations;

wherein, with respect to the at least one of the base station, at least one of the base station transmitter system and the base station receiving system wirelessly communicates with one of the mobile terminals by selectively transmitting or receiving data according to a plurality of different PN code parameters as a result of dynamically modifying the transmitting or receiving data's PN code parameters based on predetermined criteria relating to achieving an optimal communication rate.

29. The cellular communication system of claim 28, wherein the at least one base station is coupled to the system backbone by way of a wireless connection.

30. The cellular communication system of claim 28, wherein the base station transmitting system of the at least one base station is controllable to select any of a plurality of different data transmission rates.

31. The cellular communication system of claim 30, wherein any of the plurality of different data transmission rates is selected by way of at least one of selecting among different PN code lengths and selecting among different chipping rates.

32. A cellular communication system, comprising:
a plurality of base stations coupled to a system backbone, each of the base stations comprising a base station receiver system for receiving wireless communications and a base station transmitter system for transmitting wireless communications; and
a plurality of mobile terminals each for communicating with the system backbone by way of at least one of the plurality of base stations, each of the plurality of mobile terminals having a mobile terminal transmitter for transmitting wireless communications to the at least one the plurality of base stations and a mobile terminal receiver system for receiving wireless communications from the at least one of the plurality of base stations;
wherein, with respect to the at least one of the base station, at least one of the base station transmitter system and the base station receiving system wirelessly communicates with one of the mobile terminals by selectively transmitting or receiving data according to a plurality of different transmission parameters based on communications received from the mobile terminal.

33. The cellular communication system of claim 32, wherein the base station receiving system of the at least one base station is controllable to select any of a plurality of different data transmission rates.

34. The cellular communication system of claim 33, wherein any of the plurality of different data transmission rates is selected by way of at least one of selecting among different PN code lengths and selecting among different chipping rates.

35. The cellular communication system of claim 32, wherein the at least one base station is coupled to the system backbone by way of a wireless connection.

36. The cellular communication system of claim 32, wherein the base station transmitting system of the at least one base station is controllable to select any of a plurality of different data transmission rates.

37. The cellular communication system of claim 32, wherein any of the plurality of different data transmission rates is selected by way of at least one of selecting among different PN code lengths, selecting among different chipping rates, and selecting among different modulation schemes.

38. A cellular communication system, comprising:
a plurality of base stations coupled to a system backbone, each of the base stations comprising a base station receiver system for receiving wireless communications and a base station transmitter system for transmitting wireless communications; and
a plurality of mobile terminals each for communicating with the system backbone by way of at least one of the plurality of base stations, each of the plurality of mobile terminals having a mobile terminal transmitter for transmitting wireless communications to the at least one the plurality of base stations and a mobile terminal receiver system for receiving wireless communications from the at least one of the plurality of base stations;
wherein, with respect to the at least one of the base station, at least one of the base station transmitter system and the base station receiving system wirelessly communicates with one of the mobile terminals by selectively transmitting or receiving data according to a plurality of different PN code parameters as a result of dynamically modifying the transmitting or receiving PN code parameters based on predetermined criteria relating to achieving an optimal communication rate; and wherein at least another one of the base stations cannot vary any of its transmission parameters.

39. The cellular communication system of claim 38, wherein the base station transmitting system of the at least one base station is controllable to select any of a plurality of different data transmission rates.

40. The cellular communication system of claim 38, wherein the base station receiving system of the at least one base station is controllable to select any of a plurality of different data transmission rates.

41. A base station coupled to a system backbone for use in a cellular communication system, the base station comprising:
a transmitting system for wirelessly communicating data to a mobile terminal included in the cellular communication system; and
a receiving system for wirelessly receiving data from the mobile terminal;
wherein at least on of the transmitting system and the receiving system wirelessly communicates with the mobile terminal by selectively transmitting or receiving data according to a plurality of different transmission parameters based on communications received from the mobile terminal.

42. The base station of claim 41, wherein the base station is coupled to the system backbone by way of a wireless connection.

43. The base station of claim 41, wherein the transmitting system is controllable to select any of a plurality of different data transmission rates.

44. The base station of claim 43, wherein any of the plurality of different data transmission rates is selected by way of at least one of selecting among different PN code lengths, selecting among different chipping rates, and selecting among different modulation schemes.

45. The base station of claim 41, wherein the transmitting system is controllable based on communications received from the mobile terminal.

46. The base station of claim 41, wherein the plurality of different transmission parameters comprise different power levels at which data is transmitted.

* * * * *